(12) United States Patent
Takahashi et al.

(10) Patent No.: US 6,392,168 B2
(45) Date of Patent: May 21, 2002

(54) SMALL ROTARY ENCODER

(75) Inventors: Kisaburo Takahashi; Mitsuyoshi Sasaki, both of Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/725,592

(22) Filed: Nov. 29, 2000

(30) Foreign Application Priority Data

Dec. 10, 1999 (JP) ............................................. 11-351339
Dec. 10, 1999 (JP) ............................................. 11-351340
Dec. 10, 1999 (JP) ............................................. 11-351341

(51) Int. Cl.$^7$ ............................................... H01H 19/20
(52) U.S. Cl. ................... 200/11 R; 200/11 G; 200/564; 200/570; 200/336; 200/4
(58) Field of Search ...................... 200/4, 11 R–11 TW, 200/43.01, 43.04, 43.08, 564, 565, 570, 571, 336

(56) References Cited

U.S. PATENT DOCUMENTS 4,603,238 A * 7/1986 Griswold et al. ......... 200/11 R
5,072,078 A   12/1991 Rao et al. .................. 200/11 R
6,194,673 B1 * 2/2001 Sato et al. ..................... 200/4
6,218,635 B1 * 4/2001 Shigemoto et al. ......... 200/570
6,333,473 B1 * 12/2001 Sawada et al. ................. 200/4

FOREIGN PATENT DOCUMENTS

| GB | 1537028 | 12/1978 | .......... H01H/19/02 |
| JP | 3-13947 | 3/1991 | .......... H01H/19/56 |
| JP | 11-39998 | 2/1999 | .......... H01H/19/56 |

* cited by examiner

Primary Examiner—Michael Friedhofer
(74) Attorney, Agent, or Firm—Brinks Hofer Gilson & Lione

(57) ABSTRACT

A rotary encoder including a code member having an annular plate-shaped portion and a plurality of tongues formed as a result of bending from the plate-shaped portion. The code member is formed of a metallic plate. The code member is mounted to the rotary member so that the tongues are positioned at the circumferential surface of the rotary member, and the plate-shaped portion is positioned at an end surface of the rotary member. This makes it possible to provide a low-cost rotary encoder of reduced size.

20 Claims, 28 Drawing Sheets

SMALL ROTARY ENCODER

BACKGROUND OF THE INVENTION

1. Field of the Invention

The present invention relates to rotary encoders that are used in, for example, computer terminal devices, portable communication devices, or sound devices.

2. Description of the Related Art

The structure of a conventional rotary encoder will be described with reference to FIGS. 51–55. As best seen in FIG. 53, an insulating base 51 molded out of synthetic resin includes a base portion 51b having a hole 51a in the center portion thereof, a pair of arms 51c which extend at right angles from opposite ends of the base portion 51b, and supporting portions 51d formed on the ends of the arms 51c. The supporting portions 51d have holes formed therein by cutting away portions thereof.

Contactors 52, formed of metallic plates, have contact portions 52a and terminal portions 52b. Similarly, a common contactor 53, formed of a metallic plate, has a contact portion 53a and a terminal portion 53b. The contactors 52 and the common contactor 53 are disposed in a row and are embedded into and mounted to the base portion 51b. The contact portions 52a and the contact portion 53a are positioned within the hole 51a. The terminals 52b and the terminal 53b protrude outwardly from the base portion 51b.

As best seen in FIG. 54, a resilient plate 54, formed of a metallic plate, is disposed in a row with the contactors 52 and the common contactor 53 and is also mounted to the base portion 51b.

As best seen in FIGS. 52 and 55, a cylindrical rotary member 55 comprises a cylindrical portion 56 molded out of synthetic resin, and a code member 57 provided at the outer circumferential surface of the cylindrical portion 56. The code member 57 is formed of an electrically conductive material. In particular, the code member 57 is formed by molding electrically conductive resin twice.

A common pattern 57a, a comb-like code pattern 57b, and a clicking uneven portion 56a are formed at the outer circumferential surface of the cylindrical portion 56 so as to be disposed in a row along the direction of the rotational axis.

Shafts 56b are provided at both ends of the cylindrical portion 56. A noncircular hole 56c is formed in the center portion of the cylindrical portion 56.

The rotary member 55 is rotatably mounted to the insulating base 51 by snapping the shafts 56b into the supporting portions 51d of the pair of arms 51c. When the rotary member 55 has been mounted, the contact portion 53a of the common contactor 53 is in contact with the common pattern 57a, the contact portions 52a of the contactors 52 are in contact with the code pattern 57b, and the resilient plate 54 is in resilient contact with the uneven portion 56a.

A dome-shaped cover 58 is mounted to the insulating base 51 so as to cover the rotary member 55, whereby the body E2 of the encoder is constructed.

As shown in FIG. 53, the body E2 of the encoder is mounted on a printed circuit board P2 by placing the bottom surface of the insulating base 51 on the printed board P2. The terminal portions 52b of the contactors 52 and the terminal portion 53b of the common contactor 53 are inserted through a hole in the printed board P2 and are soldered onto a wiring pattern (not shown).

The conventional rotary encoder having the above-described structure operates as follows. When an actuating shaft (not shown) is inserted in the hole 56c of the rotary member 55 and is rotated from the outside, the rotary member 55 is likewise rotated. When the rotary member 55 is rotated, the code member 57 is also rotated. Although the common contact 53 is always in contact with the common pattern 57a, the contactors 52 are only in intermittent contact with the code pattern 57b. This causes a pulse signal to be generated between the common contactor 53 and the contactors 52 as the rotary member 55 is rotated.

The rotation of the rotary member 55 causes the resilient plate 54 to engage and disengage with the uneven portion 56a, thereby generating a clicking of the rotary member 55.

However, the conventional rotary encoder is formed by molding the code member 57 out of electrically conductive resin. Consequently, the molding of the code member 57 is difficult and expensive to produce. In addition, since the common pattern 57a, the code pattern 57b, and the clicking uneven portion 56a are disposed in a row along the outer circumferential surface of the rotary member 55, the conventional rotary encoder is relatively large in the direction of the rotational axis of the rotary member 55.

SUMMARY OF THE INVENTION

Accordingly, it is an object of the present invention to provide a small, low-cost rotary encoder that overcomes the above-referenced problems.

To this end, according to a first aspect of the present invention, there is provided a rotary encoder comprising a rotary member which is formed of an insulating material and which has at least one of a columnar shape, a cylindrical shape, and a truncated conical shape; a code member mounted to the rotary member and formed of a metallic plate; and a plurality of contactors which contact the code member. In the rotary encoder, the code member comprises an annular plate-shaped portion and a plurality of tongues formed by bending the plate-shaped portion. The plate-shaped portion is disposed in a direction perpendicular to the direction of the rotational axis of the rotary member. The tongues are disposed so as to be exposed at a circumferential surface side of the rotary member.

Accordingly, since the code member comprising an annular plate-shaped portion and the plurality of tongues are formed of a metallic plate, it is possible to provide a low-cost rotary encoder which can be easily produced with high productivity as compared to the conventional device wherein a molded electrically conductive resin is used.

In addition, since the plate-shaped portion is disposed in a direction perpendicular to the rotational axial direction of the rotary member, and the tongues are disposed so as to be exposed at the circumferential surface side of the rotary member, a proper spacing along the rotational axis is obtained for the plate-shaped portion, thereby permiting the manufacture of a small rotary encoder.

The tongues of the code member may be formed by bending from an outer peripheral portion of the plate-shaped portion. This structure is therefore effective when the tongues need to be made long.

The tongues of the code member may alternatively be by bending from an inner peripheral portion of the plate-shaped portion. This enables material from the metallic plate to be eliminated, making it possible to provide a small, low-cost rotary encoder.

The tongues of the code member may be disposed at an outer circumferential surface side of the rotary member. Accordingly, the contactors can be freely disposed, making it possible to provide a rotary encoder adapted to various forms.

The rotary member may have a cylindrical shape, and the tongues of the code member may be disposed at an inner circumferential surface side of the rotary member. Accordingly, the code member can be made small, making it possible to provide a small rotary encoder.

When a rotary encoder comprises a rotary member, a code member, and a plurality of contactors, the code member may be embedded into the rotary member in order to be mounted to the rotary member. Accordingly, the manufacturing process can be simplified, and improved productivity is achieved, making it possible to provide a low-cost rotary encoder.

When a rotary member comprises a rotary member, a code member, and a plurality of contactors, the tongues of the code member may be fitted into a groove formed in the circumferential surface side of the rotary member in order to mount the code member to the rotary member. Accordingly, it is possible to easily adapt to various forms of the code member, so that an adaptable rotary encoder can be provided.

When the code member is embedded into the rotary member, the plate-shaped portion may be disposed at an end surface side of the rotary member, which extends perpendicular to the axis of rotation of the rotary member. Accordingly, the plate-shaped portion can be supported by a die during the manufacturing process. This makes it possible to provide a rotary encoder of improved quality.

When a rotary member comprises a rotary member, a code member, and a plurality of contactors, the contactors may be brought into contact with the plate-shaped portion and the tongues, the plate-shaped portion may be a common contact, and the tongues may be change-over contacts. Accordingly, the amount of space in the direction of the rotational axis can be reduced, making it possible to provide a rotary encoder of reduced size.

According to a second aspect of the present invention, there is provided a rotary encoder comprising a rotary member which is formed of an insulating material and which has at least one of a columnar shape, a cylindrical shape, or a truncated conical shape; a code pattern provided at an external surface of the rotary member; and a contactor which contacts the code pattern. The code pattern is formed at a circumferential surface of the rotary member. A common pattern, which is electrically conductive with the code pattern, is formed at an end surface of the rotary member. A common contactor is in contact with the common pattern.

Accordingly, since the code pattern is formed at the circumferential surface of the rotary member, and the common pattern which is electrically conductive with the code pattern is formed at an end surface of the rotary member, the code pattern can be made long, and the length of the rotary member in the direction of the rotational axis can be made smaller than that of a rotary member of a conventional rotary encoder. Therefore, a reduced size rotary encoder can be provided.

The code pattern may be formed at an outer circumferential surface of the rotary member. Accordingly, the code pattern can be made long, and the contactors can be freely disposed, making it possible to provide a rotary encoder which can adapt to various forms.

When a rotary encoder comprises a rotary member, a code pattern, and a contactor, the rotary member may have a cylindrical shape, and the code pattern may be formed at an inner circumferential surface of the rotary member. Accordingly, the height of the contactor can be reduced, making it possible to provide a smaller rotary encoder.

When a rotary encoder comprises a rotary member, a code pattern, and a contactor, a plurality of the contactors may be disposed opposite each other, with the circumferential surface of the rotary member being disposed therebetween, and the common contactor may be disposed so as to oppose the end surface of the rotary member. Accordingly, they are not disposed in a row along the rotational axis with respect to each other, so that a proper space factor along the rotational axis can be obtained, making it possible to provide a rotary encoder of reduced size.

When a plurality of the contactors are disposed opposite each other, with the circumferential surface of the rotary member being disposed therebetween, and the common contactor is disposed so as to oppose the end surface of the rotary member, the contactors and the common contactor may be mounted to an insulating base formed of an insulating material, and may be provided so as to extend in the direction of the rotary member with the insulating base as a reference surface. Accordingly, the reference of the contactors and the common contactor in the height direction is the insulating base, so that the precision with which they are mounted relative to each other is increased. Therefore, it is possible to provide a highly precise rotary encoder.

According to a third aspect of the present invention, there is provided a rotary encoder comprising a rotary member which is formed of an insulating material and which has at least one of a columnar shape, a cylindrical shape, and a truncated conical shape; a code pattern formed at an external surface of the rotary member; and a plurality of contactors which contact the code pattern. In the rotary encoder of this embodiment, the code pattern is formed at a circumferential surface of the rotary member. A clicking uneven portion is formed at one of the end surfaces of the rotary member. An engaging member is made to engage and disengage the uneven portion in order to form a click mechanism.

Accordingly, since the code pattern is formed at the circumferential surface of the rotary member, and the clicking uneven portion is formed at one end surface of the rotary member to allow the engaging member to engage and disengage the uneven portion so as to construct a click mechanism, the code pattern can be made long, and the length of the rotary member in the direction of the rotational axis can be made smaller than that of a rotary member of a conventional rotary encoder. Therefore, it is possible to provide a rotary encoder of reduced size.

A common pattern which is electrically conductive with the code pattern may be formed at the other end surface of the rotary member which opposes the one end surface of the rotary member, and a common contactor may be in contact with the common pattern. Accordingly, the space in the rotational axial direction at the common pattern can be reduced, making the size in the rotational axial direction even smaller. Therefore, it is possible to provide a rotary encoder of reduced size.

When a common pattern which is electrically conductive with the code pattern is formed at the other end surface of the rotary member that opposes the one end surface of the rotary member, and a common contactor is in contact with the common pattern, the plurality of contactors may be disposed opposite each other, with the circumferential surface of the rotary member being disposed therebetween, the engaging member may be disposed so as to oppose the one end surface of the rotary member, and the common contactor may be disposed so as to oppose the other end surface of the rotary member. Accordingly, these components are not disposed in a row along the rotational axis with respect to each other, so that a proper space factor can be obtained. This makes it possible to provide a rotary encoder of reduced size.

When the plurality of contactors are disposed opposite each other, with the circumferential surface of the rotary member being disposed therebetween, the engaging member is disposed so as to oppose the one end surface of the rotary member, and the common contactor is disposed so as to oppose the other end surface of the rotary member, the contactors and the common contactor may be mounted to an insulating base formed of an insulating material, and the contactors, the common contactor, and the engaging member may be provided so as to extend in the direction of the rotary member, with the insulating base as a reference surface. Accordingly, the reference of the contactors, the common contactor, and the engaging member in the height direction is the insulating base, so that the precision with which they are mounted relative to each other can be increased. Therefore, it is possible provide a highly precise rotary encoder.

DESCRIPTION OF THE PREFERRED EMBODIMENT

Figure 1:
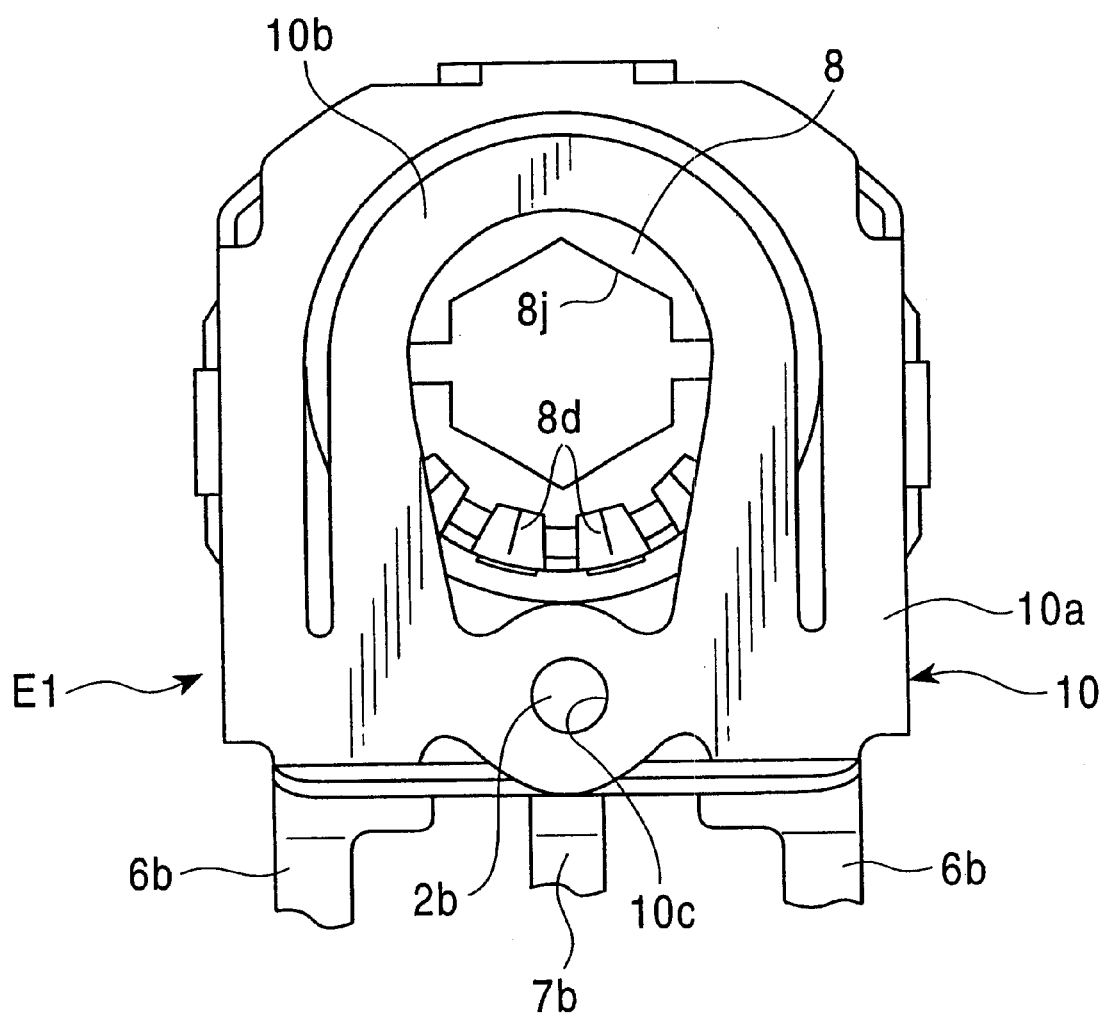
FIG. 1 is a front view of a rotary encoder in accordance with the present invention.
Figure 2:
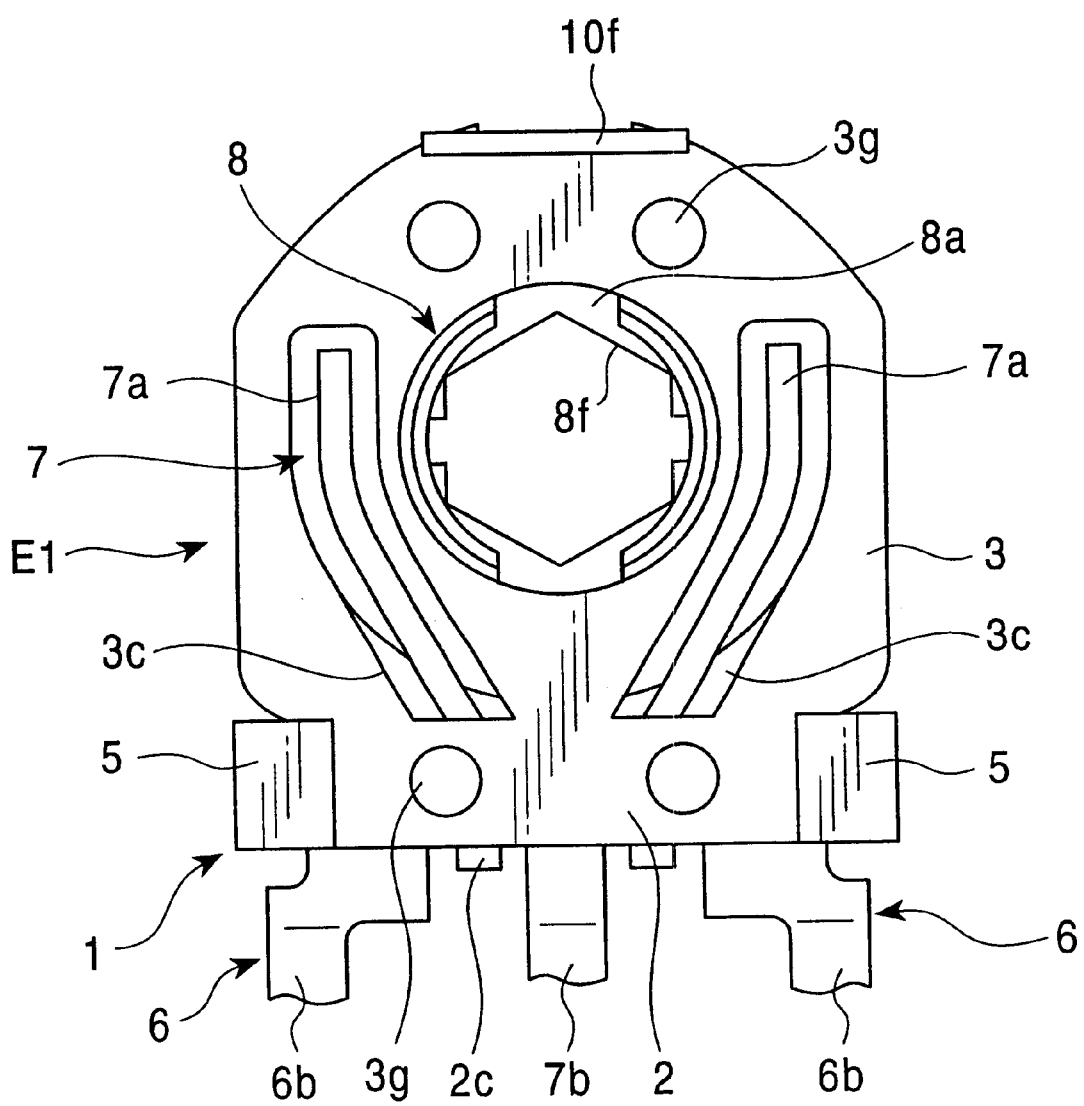
FIG. 2 is a back view of the rotary encoder in accordance with the present invention.
Figure 3:
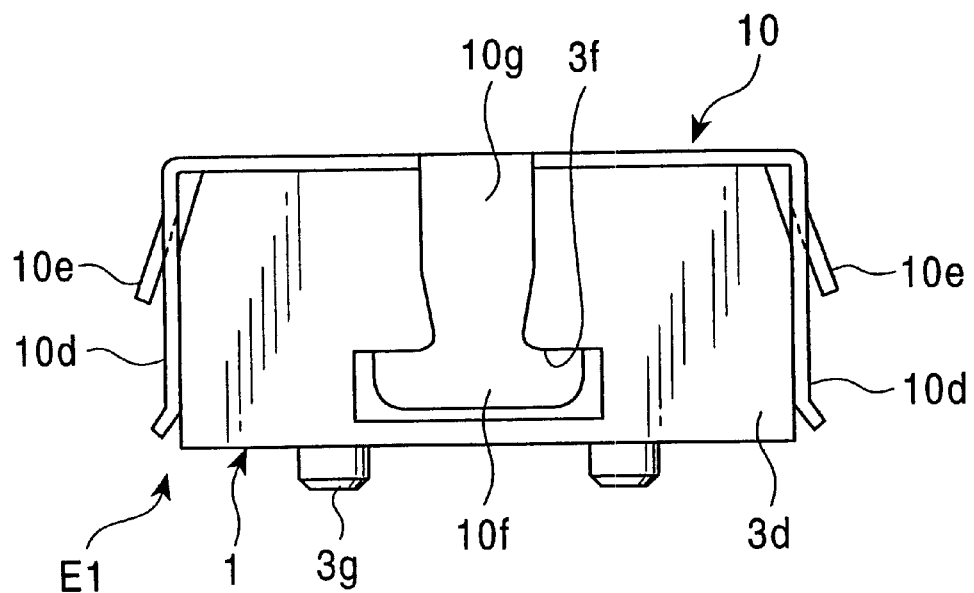
FIG. 3 is a top view of the rotary encoder in accordance with the present invention.
Figure 4:
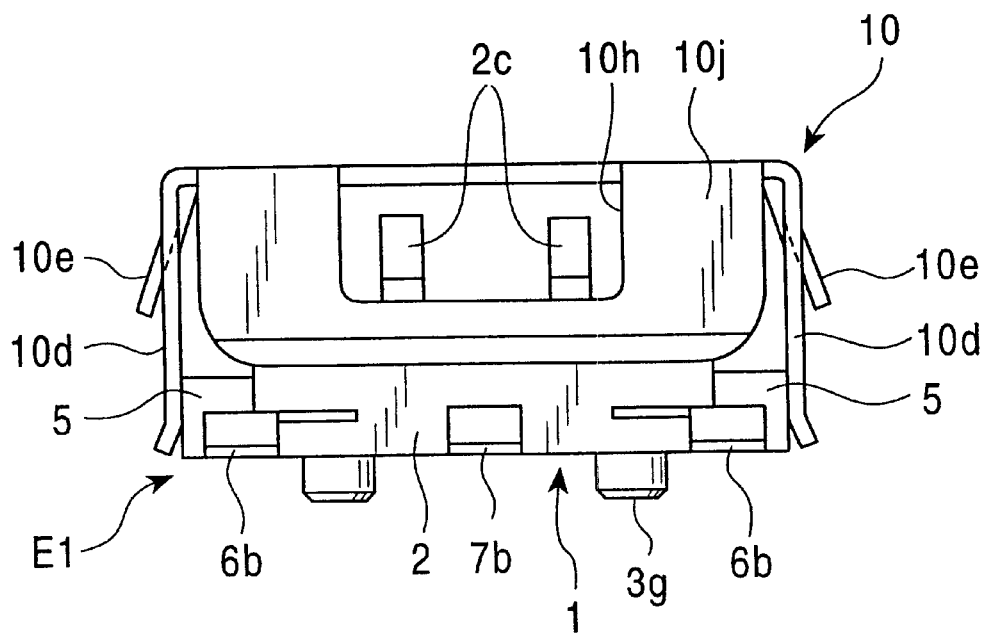
FIG. 4 is a bottom view of the rotary encoder in accordance with the present invention.

Referring to FIGS. 1–50, the structure of the rotary encoder in accordance with the present invention will be described. In the preferred embodiment shown in FIGS. 1–11, an insulating base 1 comprises a rectangular main base portion 2, a side wall 3 provided vertically at right angles to the main base portion 2, and a pair of auxiliary base portions 5 connected at both sides of the main base portion 2 by thin portions 4. The insulating base 11 is molded out of an insulating material.

The main base portion 2 includes recesses 2a formed in both end surfaces thereof, a columnar protrusion 2b formed on the center of the front end surface thereof, and a pair of catching portions 2c having tapering bottom surfaces.

Figure 6:
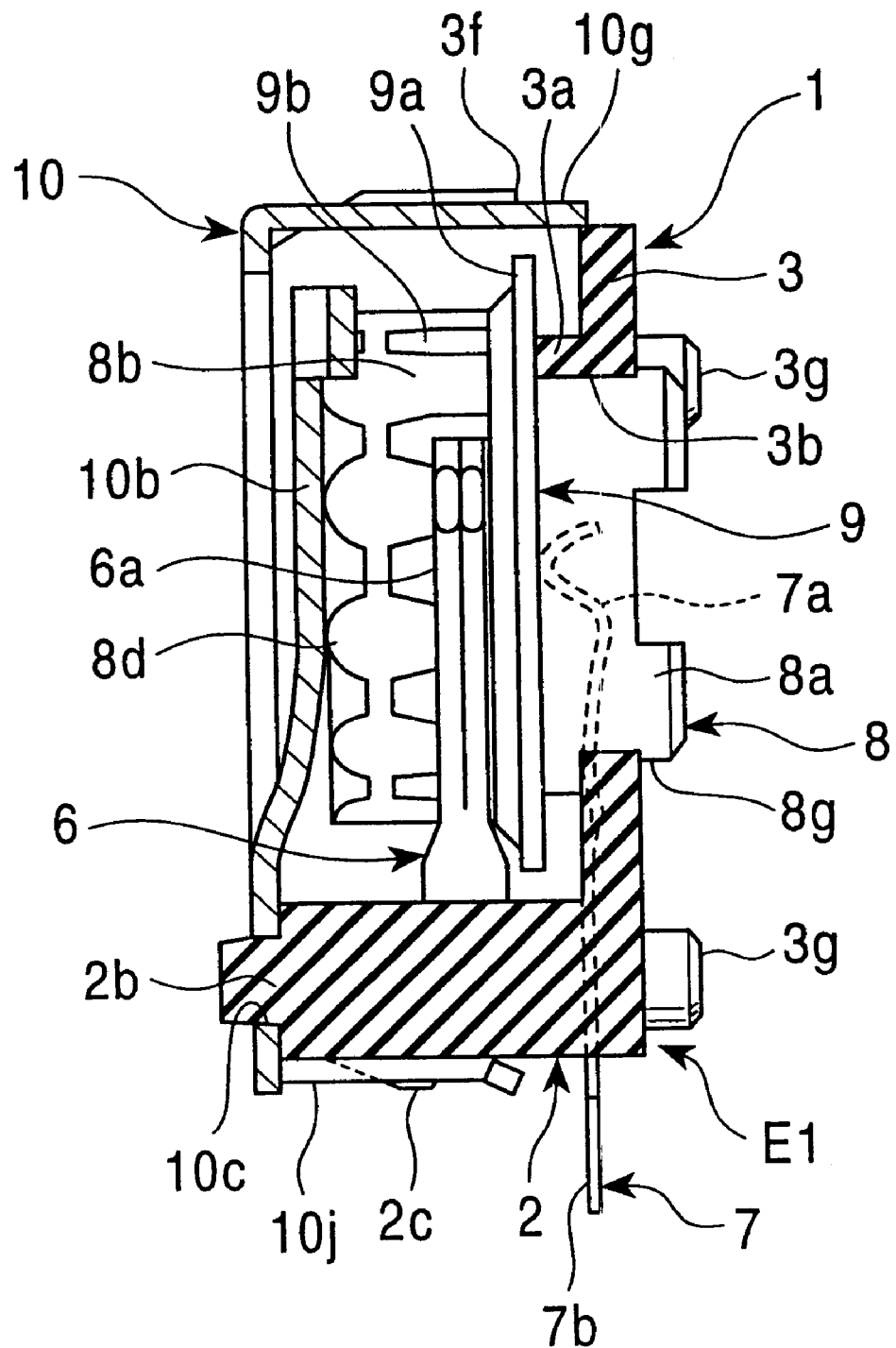
FIG. 6 is a sectional side view of the main portion of the rotary encoder in accordance with the present invention.
Figure 7:
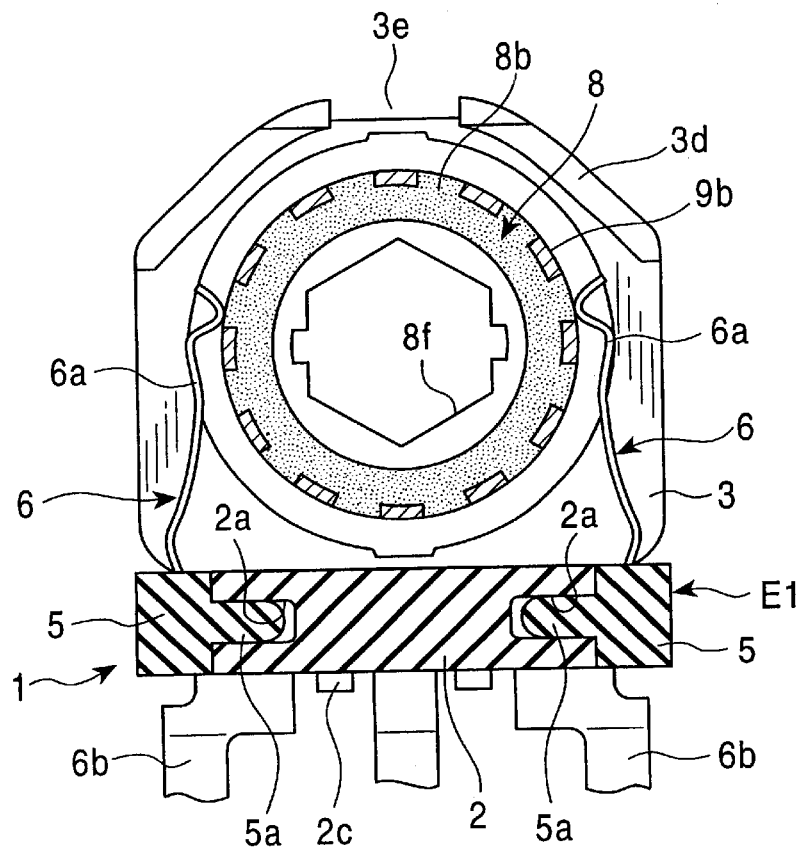
FIG. 7 is a sectional front view of the main portion of the rotary encoder in accordance with the present invention.

The side wall 3 extends vertically from the corners of the top surface of the main base portion 2 (as viewed in FIG. 6). It includes a circular hole 3b which is formed at the center portion thereof and which has a flange 3a formed thereat, a pair of clearance holes 3c which extend from both sides of the hole 3b to the main base portion 2, a pair of top walls 3d which extend at right angles from the top portion thereof, a groove 3e formed between the pair of top walls 3d, stepped catching portions 3f formed on the top surfaces of the pair of top walls 3d, and protrusions 3g.

Figure 11:
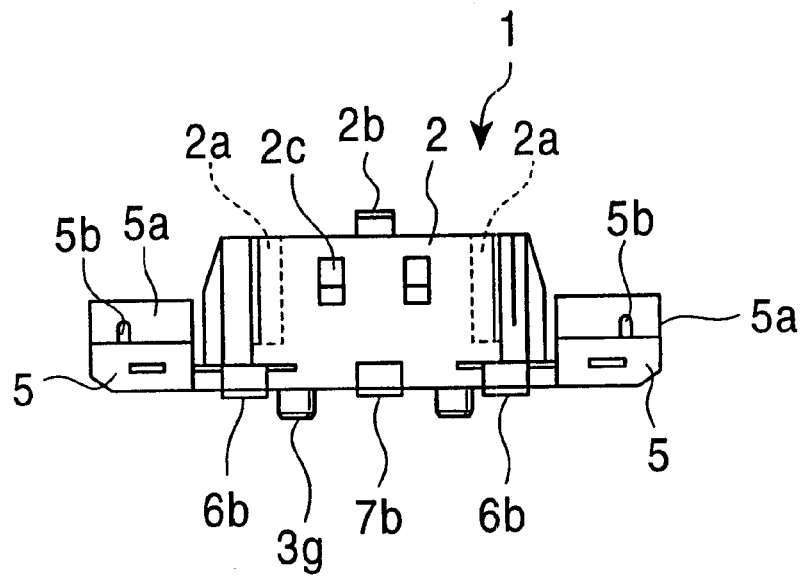
FIG. 11 is a bottom view of the first example of the insulating base of the rotary encoder in accordance with the present invention.

The pair of auxiliary base portions 5 each comprise a protrusion 5a whose edge is rounded, and a small protruding linear portion 5b formed on the bottom surface of its corresponding protrusion 5a (see FIG. 11).

Figure 5:
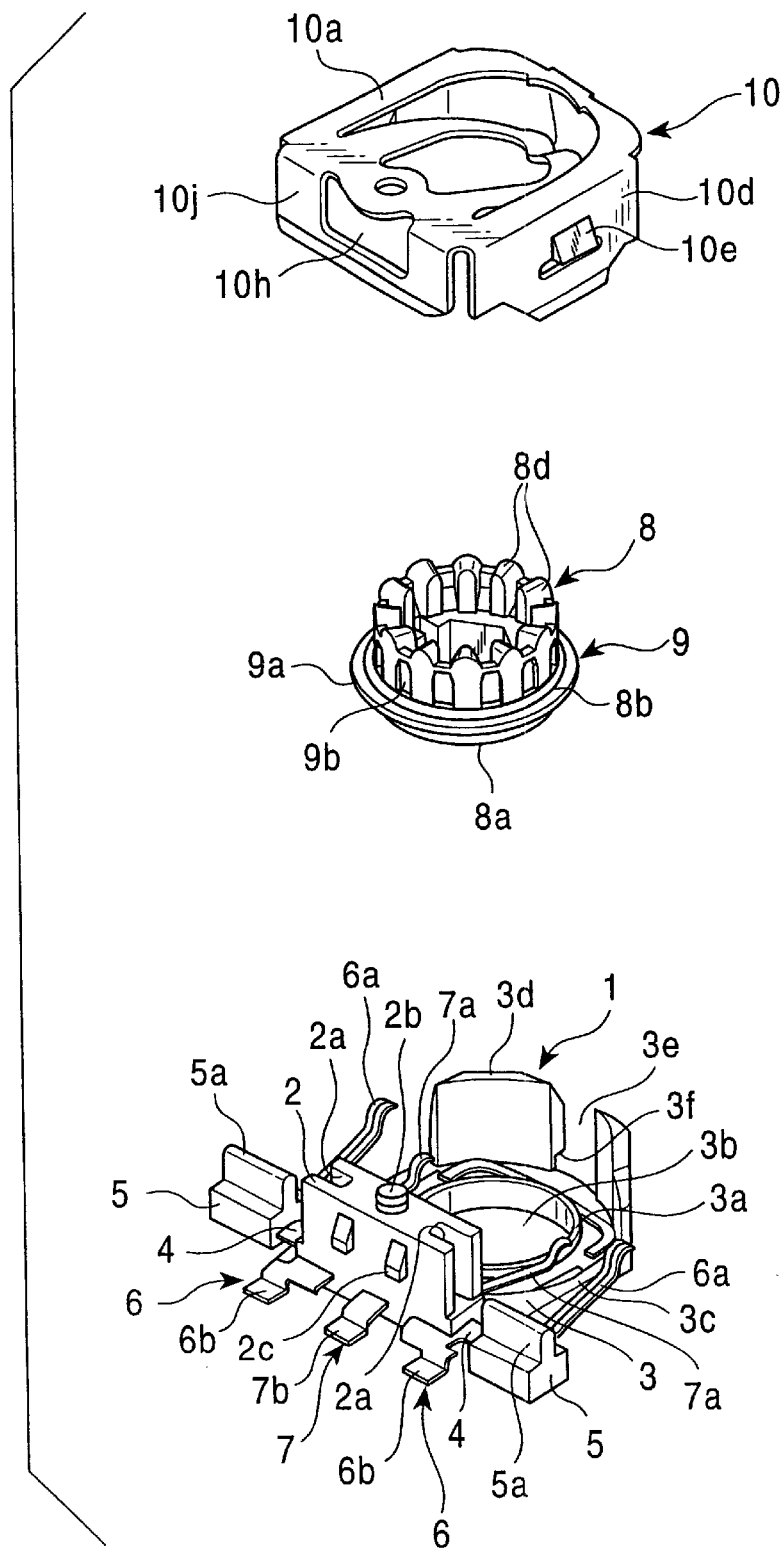
FIG. 5 is an exploded perspective view of the rotary encoder in accordance with the present invention.
Figure 8:
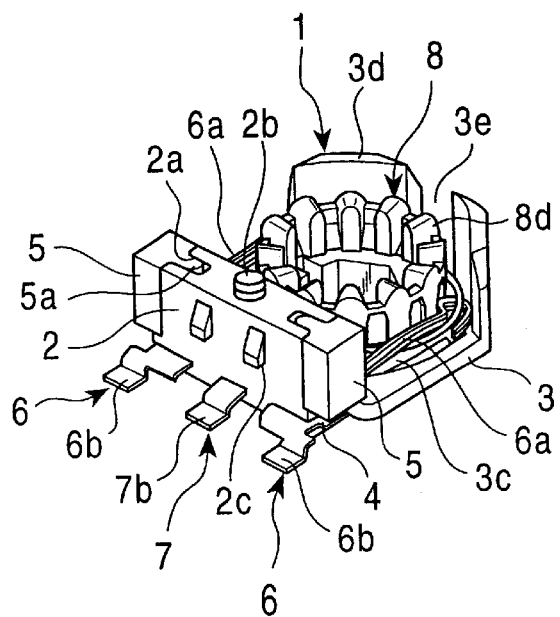
FIG. 8 is a perspective view of an insulating base and a rotary member that are assembled together in the rotary encoder in accordance with the present invention.

As shown in FIG. 8, the insulating base 1 is formed into a rectangular shape by bending the thin portions 4 from the state shown in FIG. 5 and forcibly inserting the protrusions 5a of the auxiliary base portions 5 into the corresponding recesses 2a in the main base portion 2. The protruding linear portions 5b of the auxiliary base portions 5 make it possible to easily and reliably forcibly insert the auxiliary base portions 5 into their corresponding recesses 2a.

A plurality of contactors 6, which are formed of metallic plates, comprise contact portions 6a and terminal portions 6b. The plurality of contactors 6 are embedded into and mounted to the auxiliary base portions 5. The contact portions 6a protrude upward from the top surface of the insulating base 1. The terminal portions 6b protrude downward from the bottom portion of the insulating base 1. Flat ends of the terminal portions 6b are bent so as to be disposed at one end of the insulating base 1, that is, near the location of and parallel with the side wall 3.

A common contactor 7, which is formed of metal, comprises a pair of contact portions 7a and a terminal portion 7b. The common contactor 7 is mounted to the portion of the main base portion 2 close to the side wall 3. The contact portions 7a protrude upward from the top surface of the insulating base 1, and are disposed in the clearance holes 3c of the side wall 3. The terminal portion 7b protrudes downward from the bottom surface of the insulating base 1. A flat end of the terminal portion 7b is bent so as to be disposed at an end of the insulating base 1, that is, near the location of and parallel with the side wall 3. Thus, with reference to the plane of the side wall 3, the common contactor 7 is mounted facing downward.

In the preferred embodiment, portions of the plurality of contactors 6 are embedded in the main base portion 2 and the auxiliary base portions 5 so as to be connected between these components (see FIG. 5). The thin portions 4, which connect the main base portion 2 to the auxiliary base portions 5, are formed on portions of the corresponding contactors 6.

The thin portions 4 may be formed by using metallic plates which are different from those used to form the contactors 6 and which are embedded in the insulating base 1. In addition, the thin portions 4, which connect the main base portion 2 to the auxiliary base portions 5, may be formed of the insulating material used to form the insulating base 1.

Figure 13:
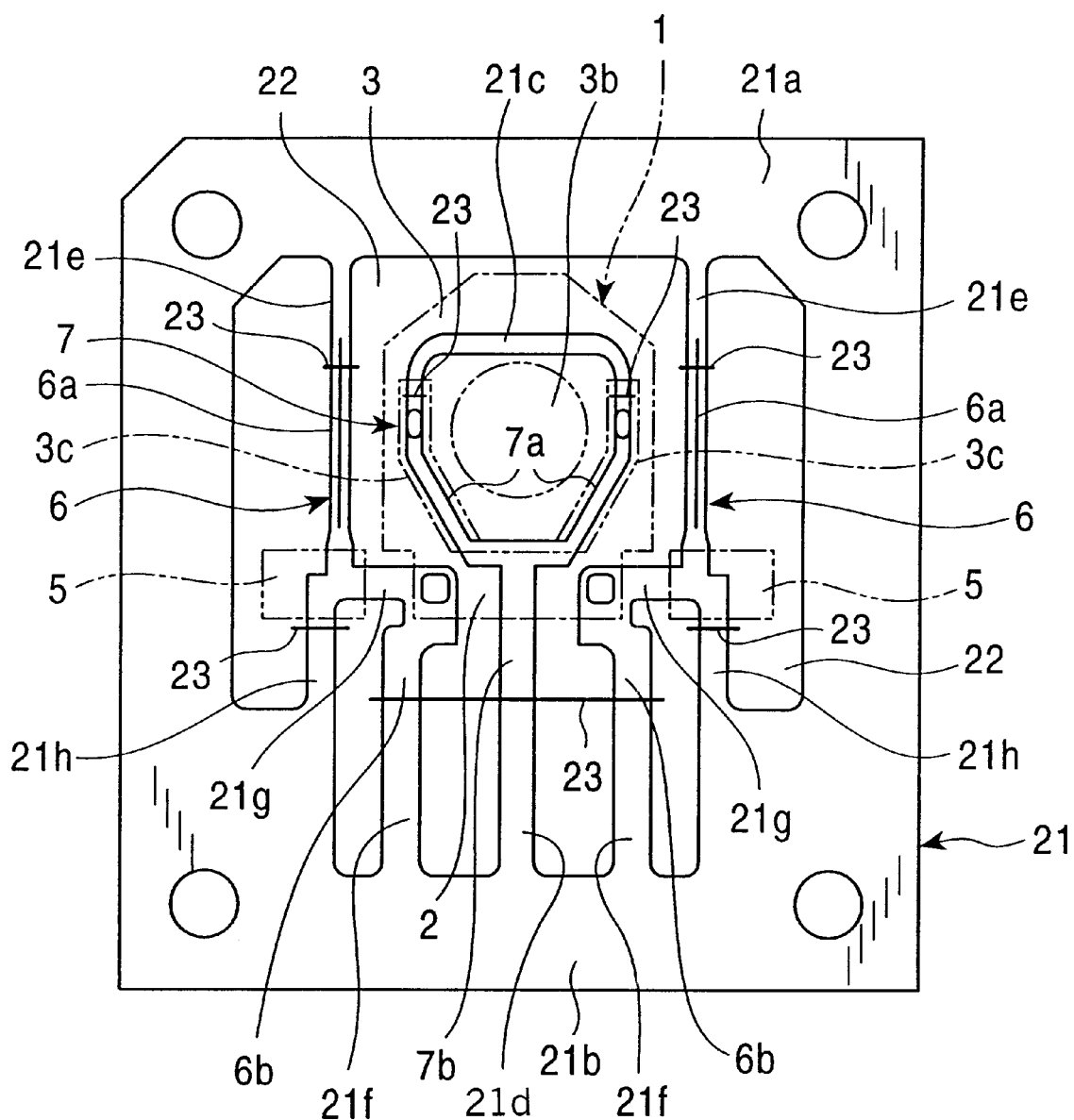
FIG. 13 illustrates a method of producing the insulating base of the rotary encoder in accordance with the present invention.
Figure 14:
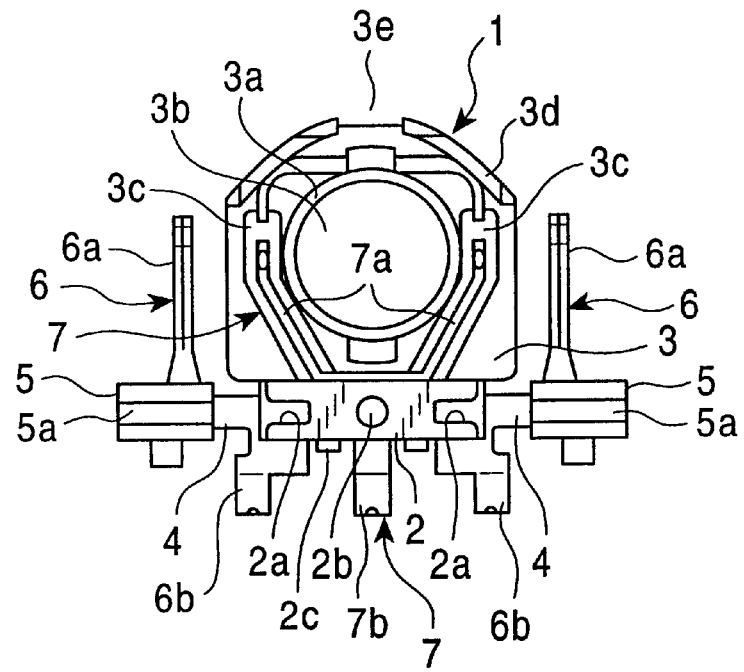
FIG. 14 is a front view of a second example of an insulating base of the rotary encoder in accordance with the present invention.
Figure 15:
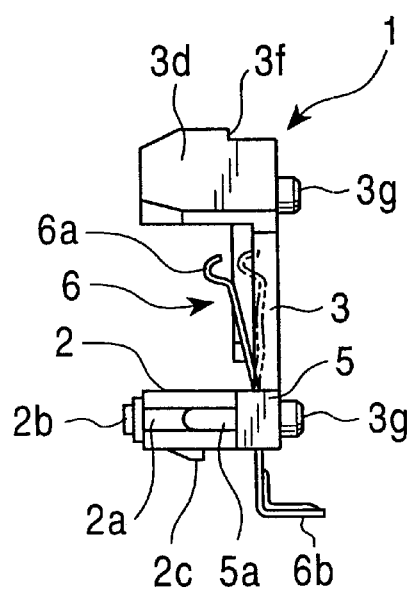
FIG. 15 is a side view of the second example of the insulating base of the rotary encoder in accordance with the present invention.
Figure 16:
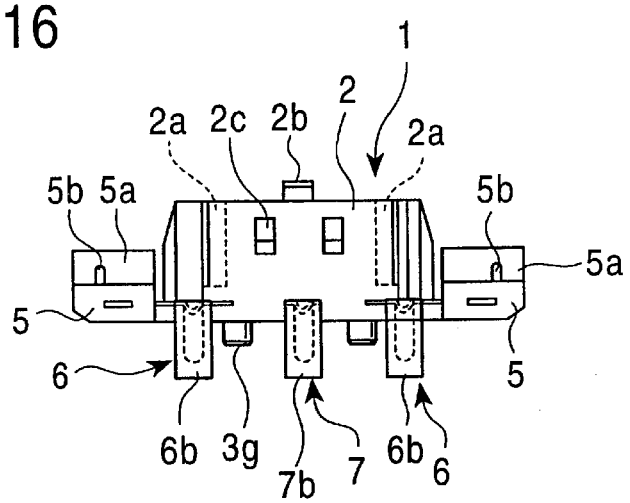
FIG. 16 is a bottom view of the second example of the insulating base of the rotary encoder in accordance with the present invention.

The method of manufacturing the insulating base 1, the contactors 6, and the common contactor 7 will be described with reference to FIG. 13. A plurality of holes 22 are formed in a metallic plate 21 (formed of a hoop material) so as to form a top frame 21a and a bottom frame 21b.

The holes 22 are formed in the center of the metallic plate 21 to form a looped portion 21c (used to form the contact portions 7a of the common contactor 7) and a terminal portion 7b (of the common contactor 7) connected to the bottom frame 21b by a connecting portion 21d.

On both sides of the looped portion 21c and the connecting portion 21d, the contact portions 6a of the contactors 6 are connected to the top frame 21a by corresponding connecting portions 21e. The terminal portions 6b of the contactors 6 are connected to the bottom frame 21b by corresponding connecting portions 21f. The contact portions 6a and the terminal portions 6b are connected by connectors 21g (which become the thin portions 4). In order to reliably hold the contact portions 6a during the molding operation, the bottom portions of the contact portions 6a are connected to the bottom frame 21b by connecting portions 21h.

Figure 9:
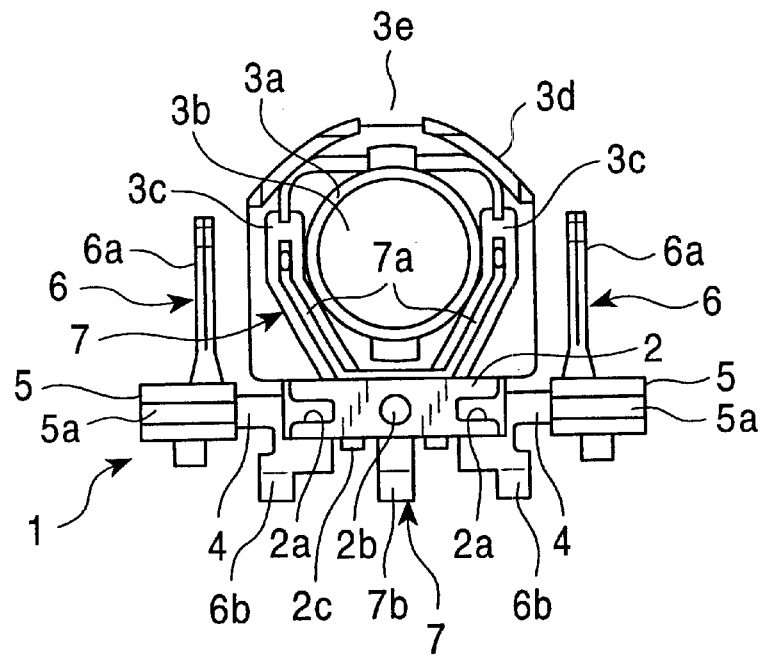
FIG. 9 is a front view of a first example of an insulating base of the rotary encoder in accordance with the present invention.
Figure 10:
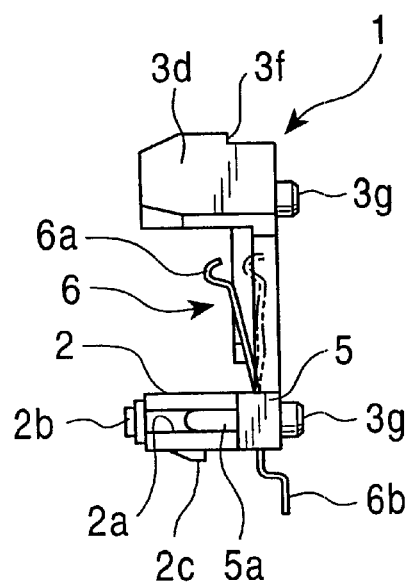
FIG. 10 is a side view of the first example of the insulating base of the rotary encoder in accordance with the present invention.

The metallic plate 21 having the above-described structure is clamped in a die (not shown). When resin is poured into the die, the main base portion 2, the side wall 3, and the auxiliary base portions 5 of the insulating base 1 are formed as shown by the dashed lines (one long and two short alternating dashes) shown in FIG. 13. Then, cuts are formed along lines 23 in order to sever the contactors 6 and the common contactor 7 from portions of the metallic plate 21, and to sever the contact portions 7a of the common contactor 7 from portions of the looped portion 21c, whereby the pair of contact portions 7a are formed in a cantilever arrangement. the resulting insulating base 1 is produced as shown in FIG. 9.

FIGS. 14 to 17 illustrate a second emobodiment of an insulating base 1, contactors 6, and common contactor 7. In the second embodiment, only the forms of terminal portions 6b of the contactors 6 and a terminal portion 7b of the common contactor 7 differ from those of the first embodiment. The other structural features are the same as those of the first embodiment so that corresponding parts are given the same reference numerals, and are not described below.

In the second embodiment, the terminal portions 6b and 7b protrude from the bottom side of the insulating base 1, and have their ends bent into an L shape.

As shown in detail in FIGS. 18–21, a first embodiment of a rotary member 8, molded out of an insulating material, comprises a shaft 8a formed at one end thereof, a holding portion 8b formed so as to be connected to the shaft 8a and having a larger diameter than the shaft 8a. A clicking uneven portion 8d is provided at an end surface 8c extending perpendicular to the rotational axis of the rotary member 8 at one side of the holding portion 8b. An end surface 8e is disposed between the shaft 8a and the holding portion 8b and extends perpendicular to the rotational axis. At the other side of the holding portion 8b, a noncircular, hexagonal hole 8f is formed in the center of the rotary member 8, and a stopper 8g is formed at an outer peripheral end of the shaft 8a.

Figure 26:
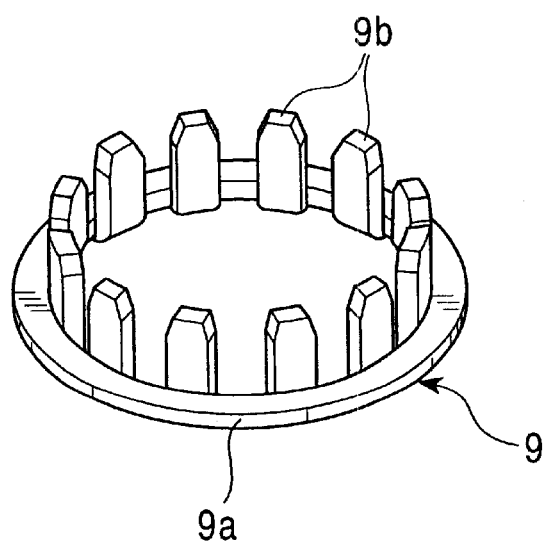
FIG. 26 is a perspective view of the code member of the rotary encoder in accordance with the present invention.
Figure 27:
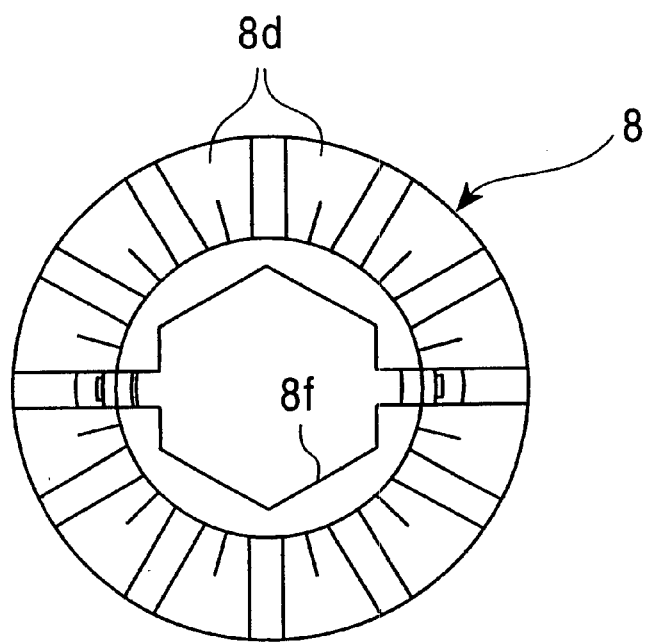
FIG. 27 is a front view of a second example of a rotary member of the rotary encoder in accordance with the present invention.
Figure 28:
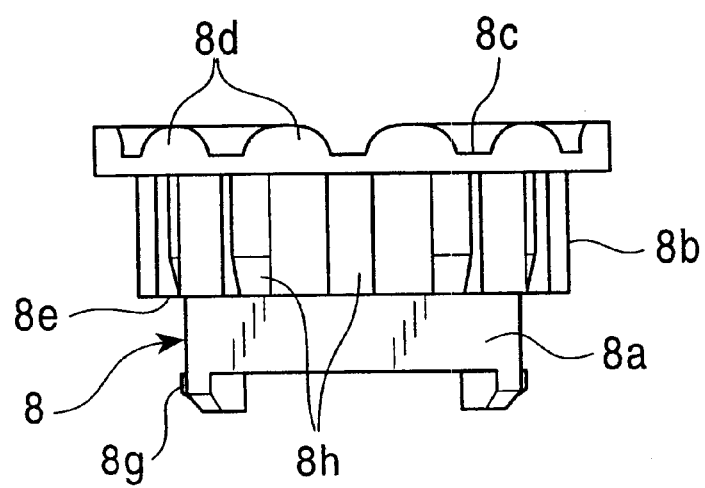
FIG. 28 is a side view of the second example of the rotary member of the rotary encoder in accordance with the present invention.
Figure 29:
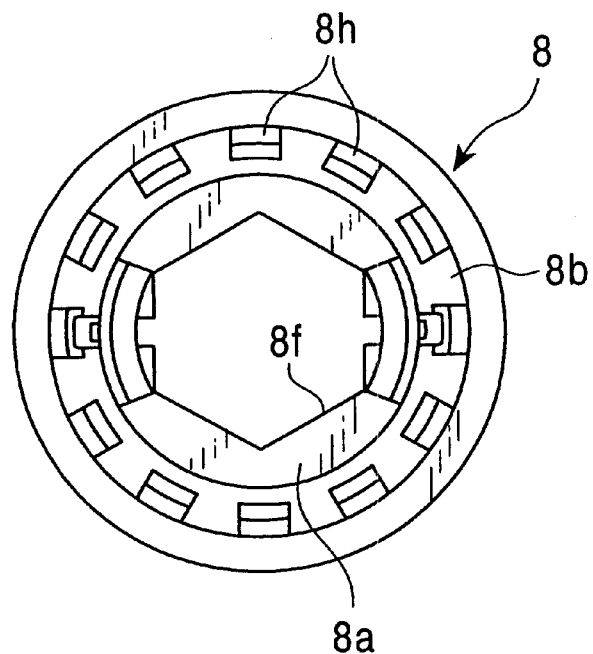
FIG. 29 is a back view of the second example of the rotary member of the rotary encoder in accordance with the present invention.
Figure 30:
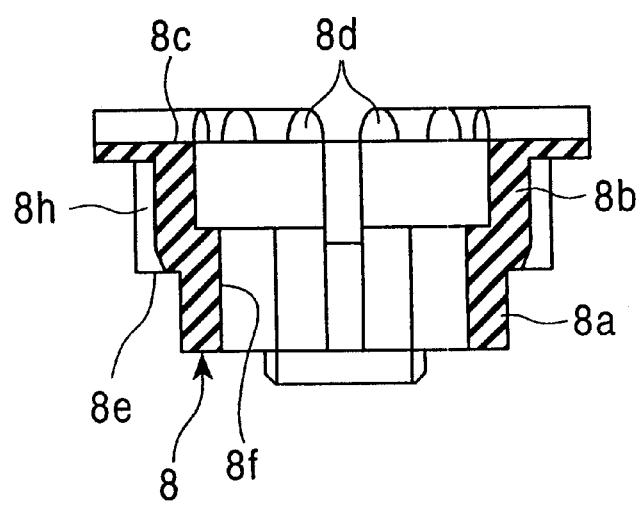
FIG. 30 is a sectional side view of the second example of the rotary member of the rotary encoder in accordance with the present invention.

As shown particularly in FIG. 26, a first embodiment of a code member 9 comprises an annular, plate-shaped portion 9a which forms a common pattern, and a plurality of tongues 9b which form a code pattern. andCode member 9 is formed of a metallic plate. The plurality of tongues 9bhh are formed by bending portions of the metallic plate from the inner periphery of the plate-shaped portion 9a.

The code member 9 is embedded into and mounted on the rotary member 8. The annular, plate-shaped portion 9a which forms a common pattern is positioned at the end surface 8e. The tongues 9b which form a code pattern are exposed at the outer circumferential surface of the holding portion 8b.

Figure 22:
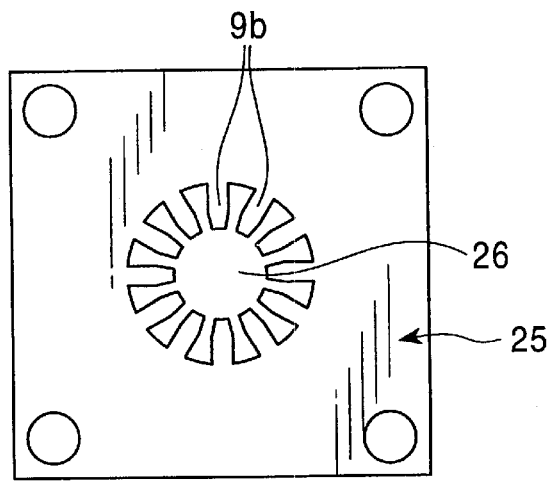
FIG. 22 illustrates a method of producing the first example of the rotary member and a code member of the rotary encoder in accordance with the present invention.
Figure 23:
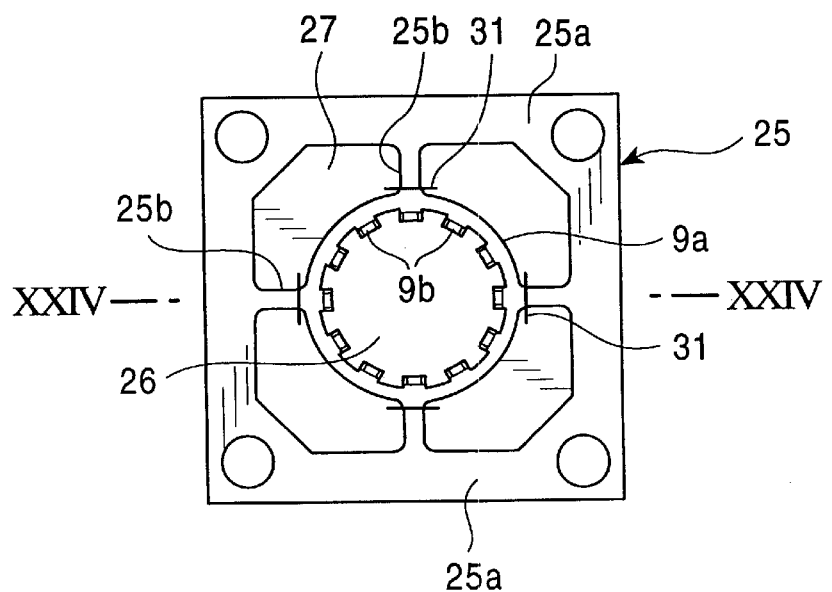
FIG. 23 illustrates the method of producing the first example of the rotary member and the code member of the rotary encoder in accordance with the present invention.
Figure 24:
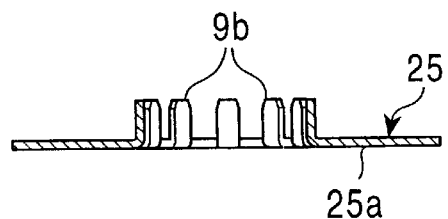
FIG. 24 is a sectional view taken along line XXIV—XXIV in FIG. 23.

A method of producing the rotary member 8 and the code member 9 will be described with reference to FIGS. 22 to 26. As shown in FIG. 22, a comb-like hole 26 is formed in the center of a hoop-shaped metallic plate 25 in order to form the tongues 9b. The ends of the tongues 9b have shapes formed by chamfering so that they can be made longer. As shown in FIG. 23, holes 27 are then formed at locations bordering the plate-shaped portion 9a to form a frame 25a connected to the plate-shaped portion 9a by a connecting portion 25b. As shown in FIG. 24, the tongues 9b are bent upwardly from the plate-shaped portion 9a.

Figure 21:
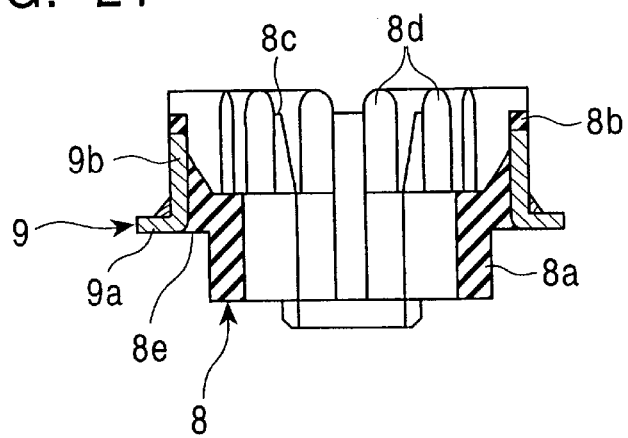
FIG. 21 is a sectional side view of the first example of the rotary member of the rotary encoder in accordance with the present invention.
Figure 25:
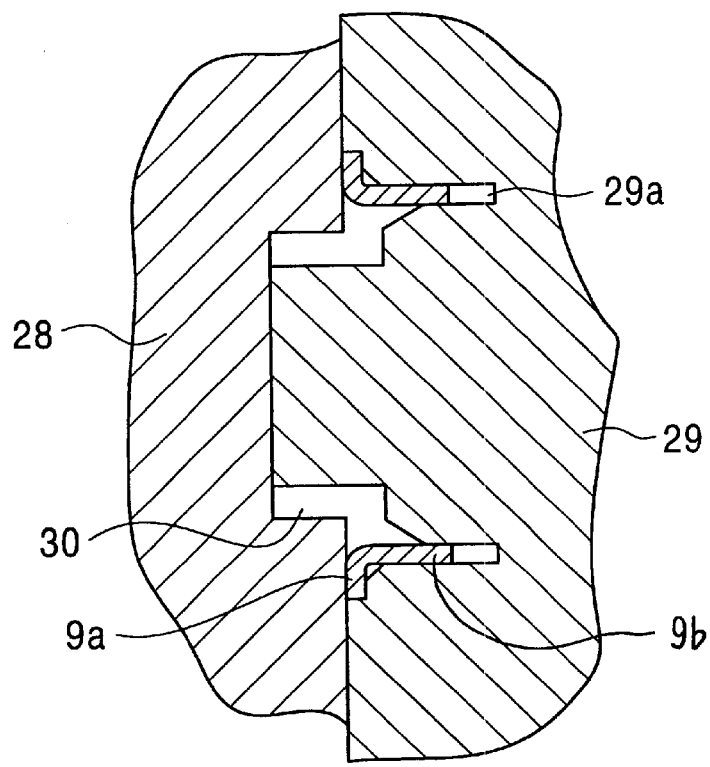
FIG. 25 illustrates the method of producing the first example of the rotary member and the code member of the rotary encoder in accordance with the present invention.

Next, as shown in FIG. 25, the plate-shaped portion 9a is clamped between two dies 28 and 29. While the tongues 9b are held in grooves 29a in the die 29, resin is poured into hollows 30 formed in the two dies 28 and 29 in order to form the rotary member 8. The code member 9 is consequently embedded in the rotary member 8 as shown in FIG. 21. After the formation of the rotary member 8, as shown in FIG. 23, cuts are formed along lines 31 to remove the assembly from the frame 25a, whereby the production of the assembled rotary member 8 and code member 9 is complete.

In the step shown in FIG. 25, the grooves 29a in the die 29 are slightly smaller in dimension than the tongues 9b. The entrance-side openings of the grooves 29a are formed so that they are wider in order to accommodate the tongues 9b in the grooves 29a so that no gaps are formed therebetween. Since resin is poured into the grooves 29a while the tongues 9b are accommodated in the groove 29a with no gaps therebetween, no resin film is formed on the outer surfaces of the tongues 9b. It should be noted that some of the recesses of the clicking uneven portion 8d are formed where the die 29 holds the tongues 9b.

FIGS. 27–33 illustrate a second embodiment of a rotary member 8 and a second embodiment of a code member 9. In the second embodiments, the code member 9 is fitted and mounted to the rotary member 8.

In addition to the structural features of the first embodiment, the rotary member 8 of the second embodiment comprises a plurality of grooves 8h in the rotational axis direction in the outer circumferential surface of the holding portion 8b. The other structural features are the same, so that corresponding parts are given the same reference numerals, and are not described below.

Figure 31:
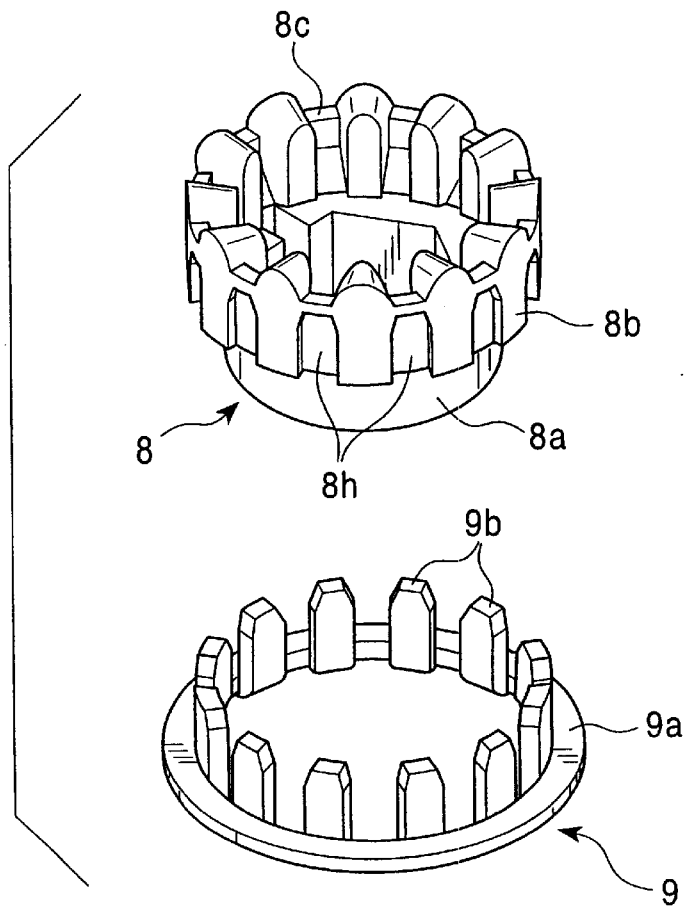
FIG. 31 is a perspective view showing a method of mounting the second example of the rotary member and a code member of the rotary encoder in accordance with the present invention.

As shown in FIG. 31, the code member 9 comprises an annular, plate-shaped portion 9a, which forms a common pattern, and tongues 9b, which form a code pattern.

Figure 32:
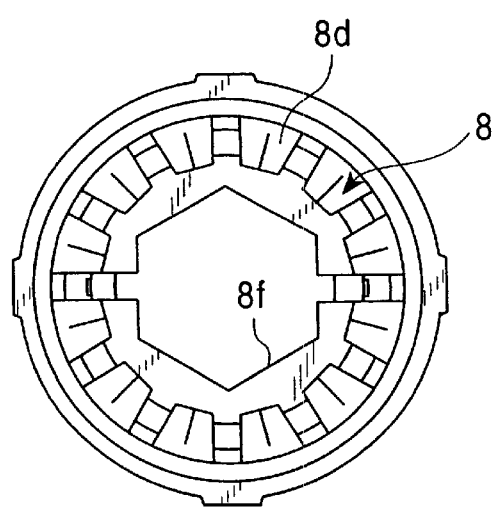
FIG. 32 is a front view showing a state in which the second example of the rotary member and the code member are assembled together in the rotary encoder in accordance with the present invention.
Figure 33:
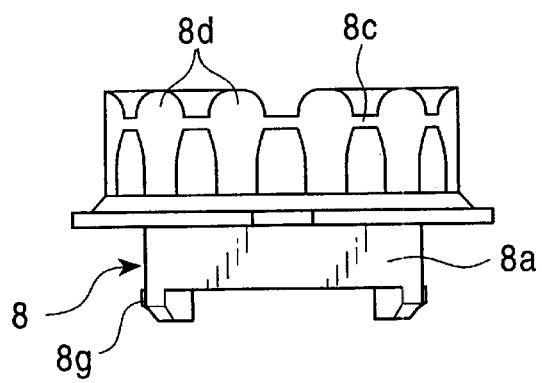
FIG. 33 is a side view showing the state in which the second example of the rotary member and the code member are assembled together in the rotary encoder in accordance with the present invention.
Figure 34:
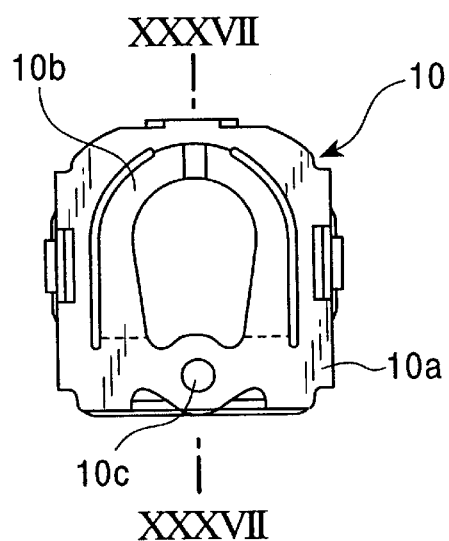
FIG. 34 is a front view of an engaging member of the rotary encoder in accordance with the present invention.
Figure 35:
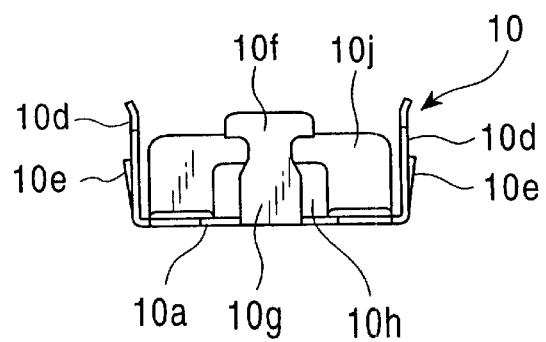
FIG. 35 is a top view of the engaging member of the rotary encoder in accordance with the present invention.
Figure 36:
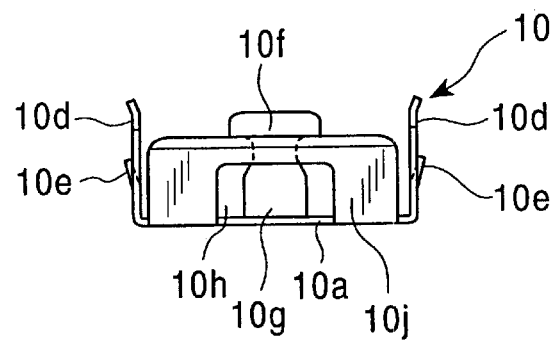
FIG. 36 is a bottom view of the engaging member of the rotary encoder in accordance with the present invention.
Figure 37:
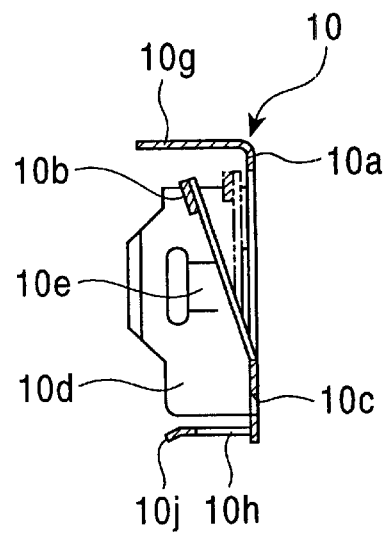
FIG. 37 is a sectional view taken along line XXXVII—XXXVII in FIG. 34.
Figure 38:
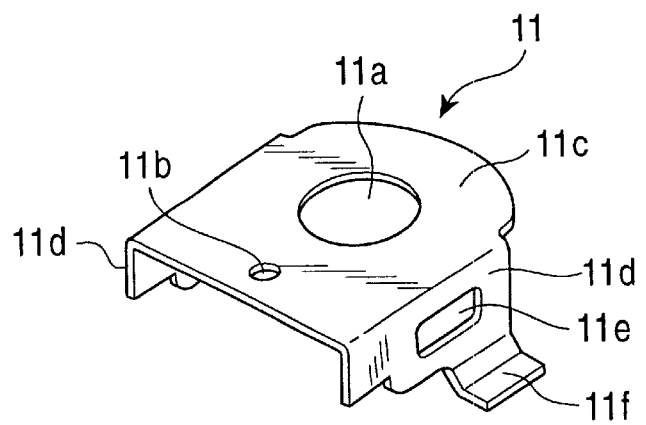
FIG. 38 is a perspective view of a first example of a mounting plate of the rotary encoder in accordance with the present invention.
Figure 39:
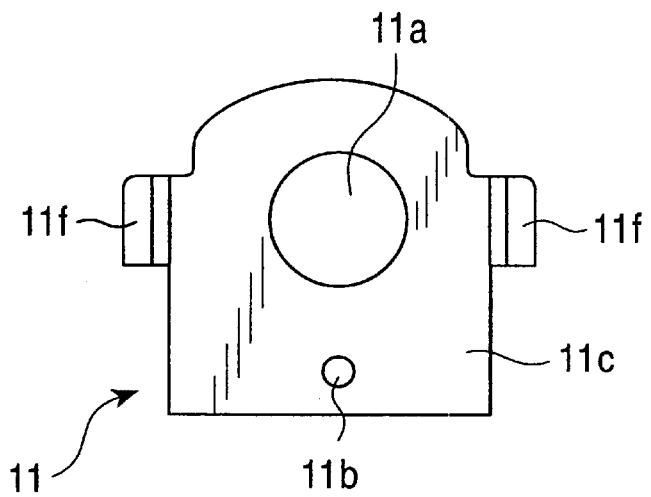
FIG. 39 is a front view of the first example of the mounting plate of the rotary encoder in accordance with the present invention.
Figure 40:
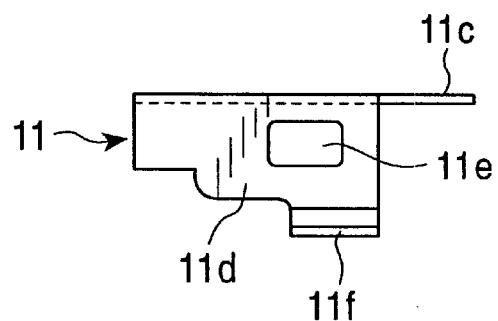
FIG. 40 is a side view of the first example of the mounting plate of the rotary encoder in accordance with the present invention.
Figure 41:
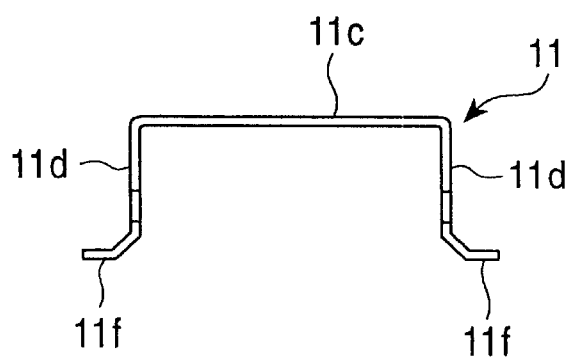
FIG. 41 is a bottom view of the first example of the mounting plate of the rotary encoder in accordance with the present invention.

As shown in FIG. 31, while the code member 9 is disposed at an end surface 8e side of the rotary member 8, chamfered portions of ends of the tongues 9b are used as guides to forcibly insert and fit the tongues 9b into the grooves 8h. When this is done, as shown in FIGS. 32 and 33, the plate-shaped portion 9a is disposed at the end surface 8e, and, with the tongues 9b being exposed at the outer circumferential surface of the holding portion 8b, the code member 9 is mounted to the rotary member 8.

In both of the above-described embodiments of rotary members 8 and the code members 9, the shafts 8a of the rotary members 8 are inserted into the corresponding holes 3b of the side walls 3 so as to be rotatably held thereby.

When the rotary member 8 is mounted to its corresponding insulating base 1, the stopper portions 8g protrude from holes 3b so as to prevent the rotary member 8 from getting dislodged. In addition, the pairs of contact portions 7a of the common contactor 7 is placed so as to oppose the corresponding end surface 8e so as to be in contact with the corresponding plate-shaped portion 9a used to form common patterns of code member 9.

Figure 12:
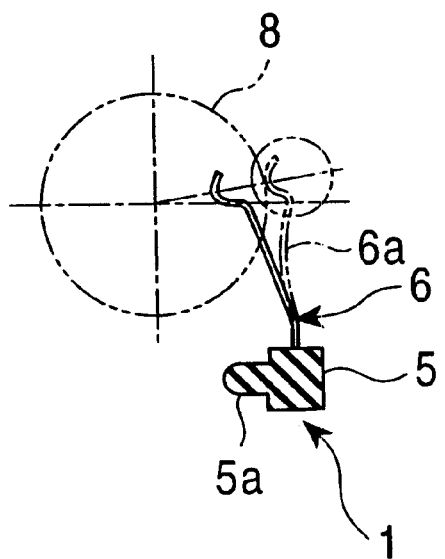
FIG. 12 shows the relationship between the first example of the insulating base and a contactor of the rotary encoder in accordance with the present invention.
Figure 17:
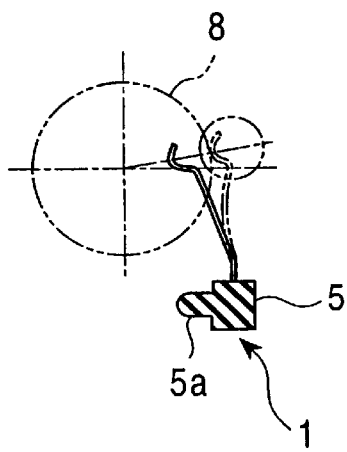
FIG. 17 shows the relationship between the second example of the insulating base and a contactor of the rotary encoder in accordance with the present invention.
Figure 18:
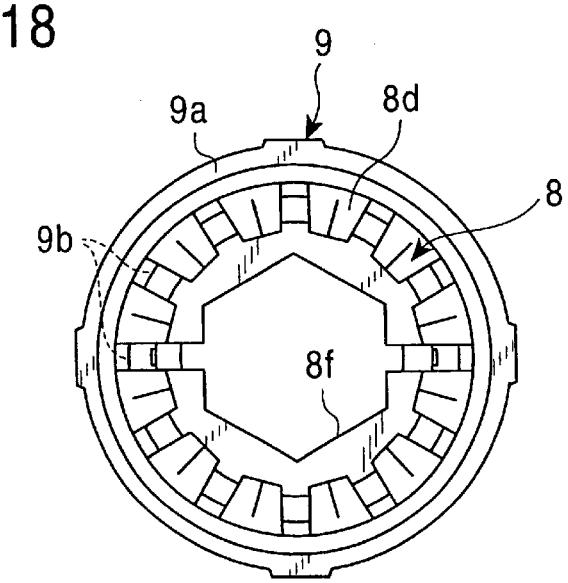
FIG. 18 is a front view of a first example of a rotary member of the rotary encoder in accordance with the present invention.
Figure 19:
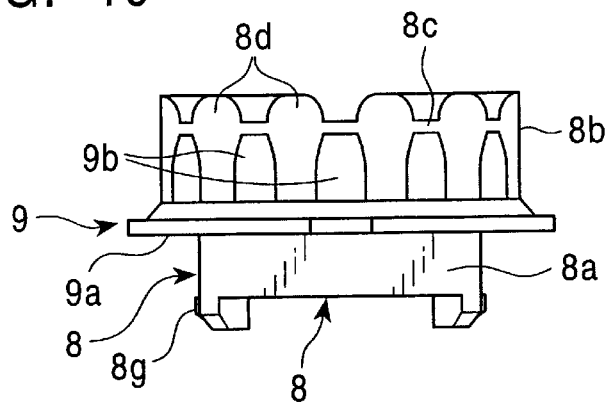
FIG. 19 is a side view of the first example of the rotary member of the rotary encoder in accordance with the present invention.
Figure 20:
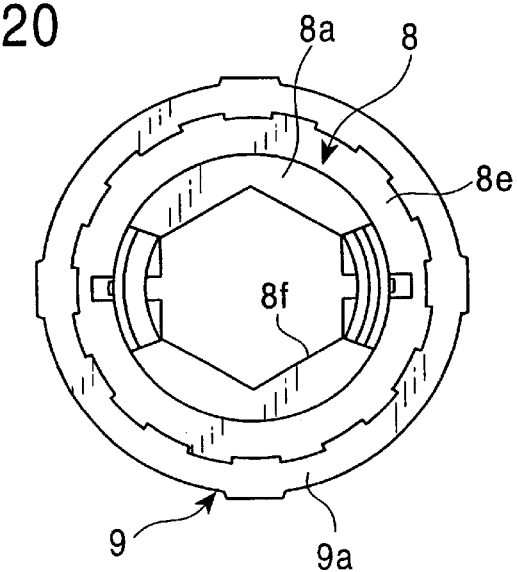
FIG. 20 is a back view of the first example of the rotary member of the rotary encoder in accordance with the present invention.

When the rotary member 8 is mounted to its corresponding insulating base 1, the plurality of contactors 6 are disposed at opposite sides with respect to each other, with the circumferential surface of the rotary member 8 being disposed therebetween. In addition, they are disposed so as to come into intermittent contact with the tongues 9b (which forms the code pattern of the code member 9). Further, as shown in FIGS. 12 and 17, the contact portion 6a, which extends from the insulating base 1, resiliently contacts the rotary member 8 at locations beyond the rotational center of the rotary member 8.

In both of the above-described embodiments, the pairs of contact portions 6a contact the corresponding code patterns with corresponding phase differences.

Although the example rotary members 8 are described as being cylindrical in shape, they may have columnar or truncated conical shapes.

Since the code member 9 has its tongues 9b formed by bending from the inner peripheral portions of the plate-shaped portion 9a, the connecting portions 25b can be disposed at any outer peripheral location thereof, so that a continuous series of processing operations using hoop materials can be carried out even if the gaps between the tongues 9b are made narrow. Alternatively, the tongues 9b may be formed by bending from the outer peripheral portions of the corresponding plate-shaped portion 9a.

Although the tongues 9b of the example code members 9 are formed at the outer circumferential surfaces of their corresponding cylindrical rotary members 8, the tongues 9b may be formed at the inner circumferential surfaces of the corresponding cylindrical rotary members 8 so that they contact the contact portions 6a of the corresponding contactors 6.

Although metallic plates are used to form the example code members 9, the code patterns and the common patterns may be formed by plating or using electrically conductive powder of turned metallic materials.

As shown with particularly in FIGS. 34–37, an engaging member 10, formed of a metallic plate, comprises a rectangular plate-shaped base portion 10a, an engaging portion 10b which is bent into a C shape at the center portion of the base portion 10a and which has a protruding end, a circular hole 10c formed in the bottom portion of the base portion 10a, a pair of side plates 10d which are formed by bending from both sides of the base portion 10a, cut-and-raised portions 10e formed at both side plates 10d, a T-shaped top side plate 10g which is formed by bending from the top side of the base portion 10a and which has a stopper portion 10f at an end thereof, and a C-shaped bottom side plate 10j which is formed by bending from the bottom side of the base portion 10a and which has a rectangular hole 10h formed in the center thereof.

The engaging portion 10b of the engaging member 10 is aligned with the insulating base 1 so as to oppose the end surface 8c of the rotary member 8 having the uneven portion 8d formed thereat. Then, the protrusion 2b is inserted into the hole 10c. Thereafter, the top side plate 10g is positioned on and pushed into the top wall 3d. After pushing the top side plate 10g into the top wall 3d, the engaging portion 10f is caught by the catching portion 3f, and the top plate 10g is positioned in the groove 3e so as to mount the top side plate 10g to the side wall 3.

At the same time that the top side plate 10g is mounted, the bottom side plate 10j is positioned at and pushed onto the bottom surface of the main base portion 2. After pushing the bottom side plate 10j into the main base portion 2, the catching portion 2c is positioned at the hole 10h in order to catch the bottom side plate 10j by the catching portion 2c, whereby the bottom side plate 10j is mounted to the main base portion 2.

In this way, the engaging member 10 is mounted at the top and bottom portions of the rotary member 8, and the side plates 10d are disposed at the left and right portions of the rotary member 8.

When the engaging member 10 is mounted, the protruding portion of the engaging portion 10b is engageably and disengageably mounted to the uneven portion 8d at the end surface 8c of the rotary member 8 in order to form a clicking mechanism.

The engaging member 10, the contactors 6, and the common contactor 7 extend in the direction of the rotary member 8, with the insulating base 1 as a reference surface. Such a structure is used to form a body E1 of the encoder.

As shown in FIGS. 38–44, a first embodiment of a mounting plate 11 is formed of a solderable metallic plate and comprises a flat portion 11c having a large circular hole 11a formed in the center thereof and a small hole 11b formed in the lower portion thereof, a pair of arms 11d formed by bending from both sides of the flat portion 11c so as to oppose each other, rectangular holes 11e formed in the centers of the arms 11d, and mounting portions 11f formed by bending from ends of the corresponding arms 11d.

Figure 42:
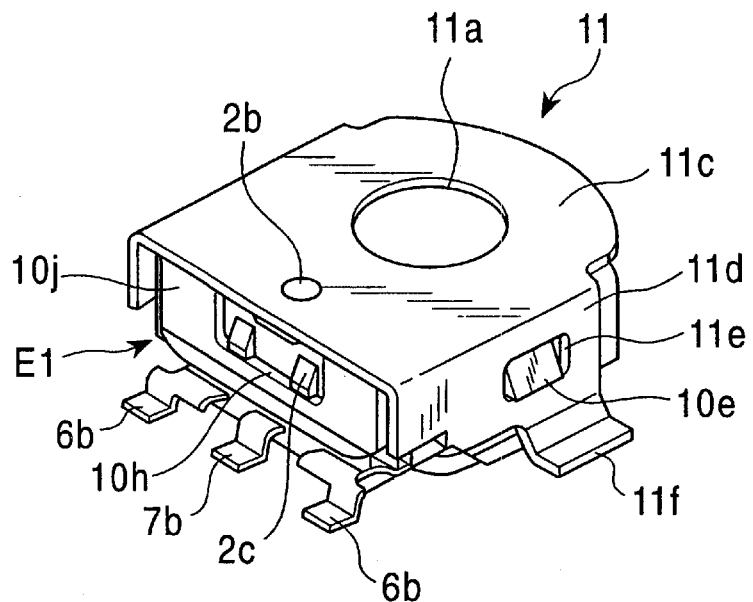
FIG. 42 is a perspective view showing a state in which the first example of the mounting plate is mounted to the body of the rotary encoder in accordance with the present invention.
Figure 43:
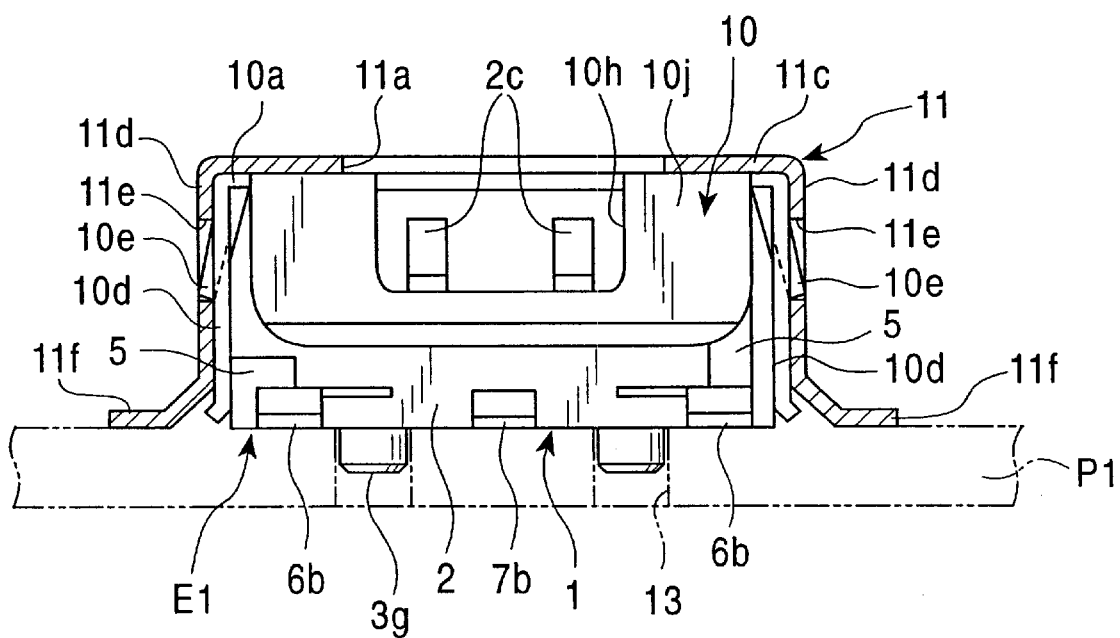
FIG. 43 is a sectional view showing the main portion of the rotary encoder in accordance with the present invention where the first example of the mounting plate is mounted to the body of the rotary encoder.
Figure 44:
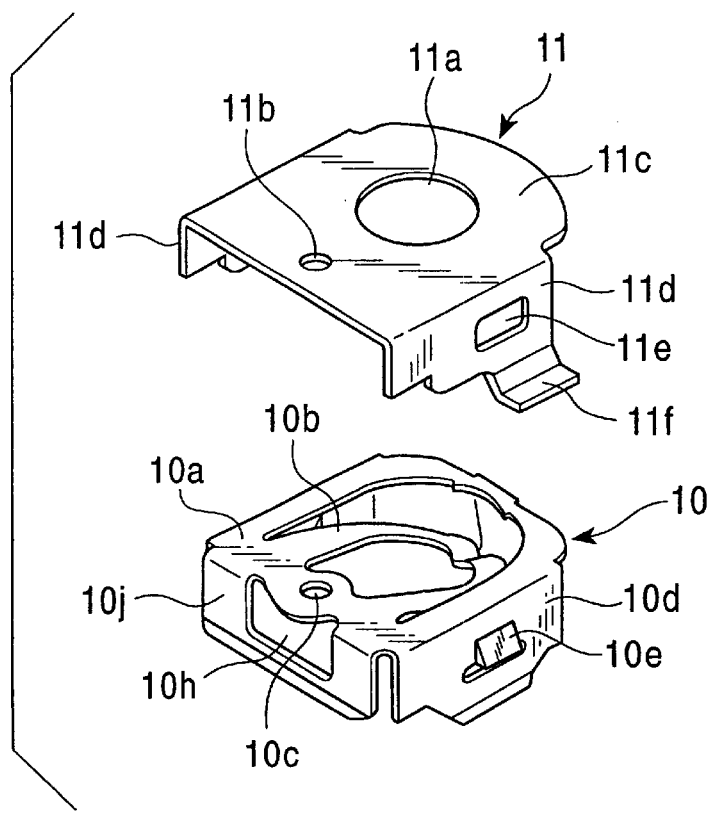
FIG. 44 is a perspective view showing the first example of the mounting plate mounted to the body of the rotary encoder in accordance with the present invention.
Figure 45:
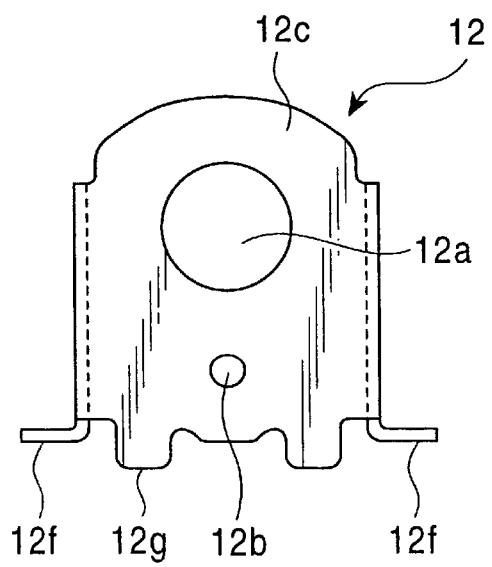
FIG. 45 is a front view of a second example of a mounting plate of the rotary encoder in accordance with the present invention.
Figure 46:
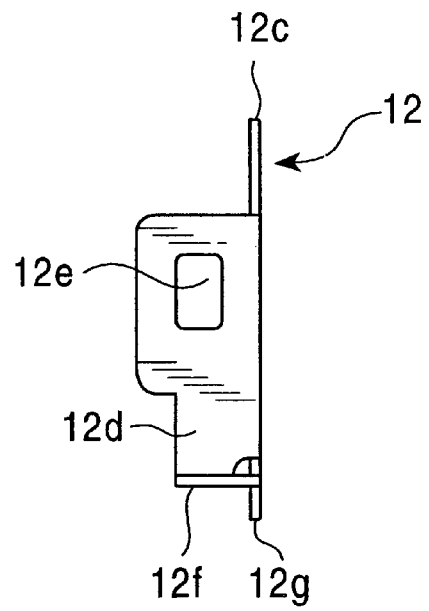
FIG. 46 is a side view of the second example of the mounting plate of the rotary encoder in accordance with the present invention.
Figure 47:
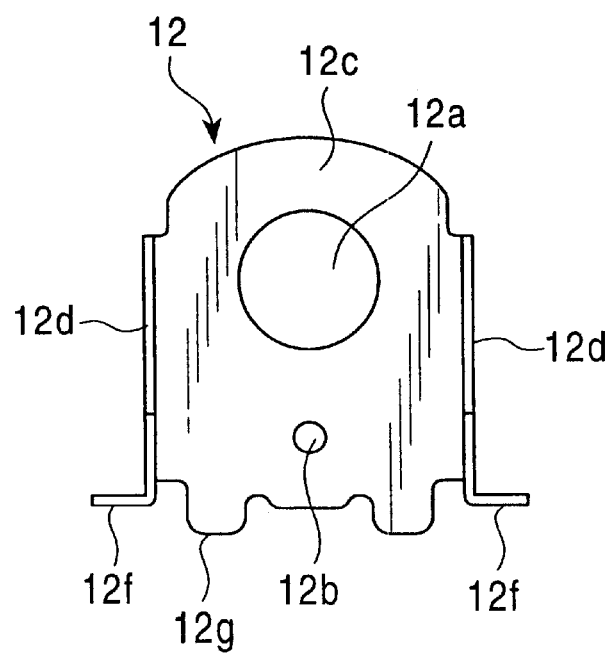
FIG. 47 is a back view of the second example of the mounting plate of the rotary encoder in accordance with the present invention.

As shown in FIGS. 42 to 44, the mounting plate 11 is positioned at the engaging member 10 side of the body E1 of the encoder in order to insert the protrusion 2b of the first embodiment of the insulating base 1 into the small hole 11b.

Then, the arms 11d are pushed onto the side plates 10d of the engaging member 10. The cut-and-raised portions 10e are positioned at the corresponding holes 11e in order to catch the arms 11d by the cut-and-raised portions 10e. This causes the mounting plate 11 to be snappingly stopped by the engaging member 10, whereby the mounting plate 11 is mounted to the engaging member 10.

As shown in FIG. 43, when the mounting plate 11 is mounted, the flat portion 11c is placed upon an outer side of the plate-shaped base portion 10a of the engaging member 10. In addition, the arms 11d are mounted to the side plates 10d of the engaging member 10, at the left and right horizontal portions of the rotary member 8. Further, the bottom surfaces of the mounting portions 11f, which are formed by bending the ends of the arms 11d extending in the rotational axis of the rotary member 8, are positioned at one end of the insulating base 1, that is, at a location near to and parallel with the side wall 3.

As shown in FIG. 43, side wall 3 side of the body E1 of the encoder, in which the mounting plate 11 is mounted, is placed on a printed board P1. At this time, the protrusions 3g are inserted into holes 13 in the printed board P1 in order to position the body E1 of the encoder. The terminals 6b of the contactors 6, the terminal 7b of the common contactor 7, and the mounting portion 11f of the mounting plate 11 are disposed on a wiring pattern (not shown) formed on the top surface of the printed board P1.

The contactors 6, the common contactor 7, and the mounting plate 11 having the above-described structures are mounted to the surface of the wiring pattern on the printed board P1 by cream soldering. This causes the body E1 of the encoder to be mounted to the printed board P1 in a direction perpendicular to the rotational axis of the rotary member 8. The body E1 of the encoder is therefore mounted to the printed board P1 in a laid down state.

The operation of the rotary encoder having the above-described structure will now be described. An operating member (not shown) engages the hole 8f in the rotary member 8 as a result of passing it through the engaging member 10 and the hole 11a in the mounting plate 11. Alternatively, the operating member engages the hole 8f in the rotary member 8 as a result of passing it through a hole (not shown) in the printed board P1. When the operating member is rotated, the rotary member 8 and the code member 9 rotate with the shaft 8a as a support.

The uneven portion 8d of the rotary member 8 is made to intermittently engage the engaging portion 10b to perform a clicking operation. In addition, the tongues 9b are configured to intermittently contact with (and separate from) the contactors 6, and the common contactor 7 is configure to continuously contact the plate-shaped portion 9a, so that a two-phase pulse signal is generated between the contactors 6 and the common contactor 7 as the rotary member 8 is rotated.

FIGS. 45–50 illustrate a second embodiment of a mounting plate 12. The second embodiment of the mounting plate 12 is formed of a solderable metallic plate, and comprises a flat portion 12c having a large circular hole 12a formed in the center portion thereof and a small hole 12b formed in the lower portion thereof, a pair of arms 12d formed by bending from both sides of the flat portion 12c so as to oppose each other, rectangular holes 12e formed in the center portions of the arms 12d, mounting portions 12f bent from the side end portions of the arms 12d, and protrusions 12g formed adjacent to the mounting portions 12f at the flat portion 12c.

Figure 48:
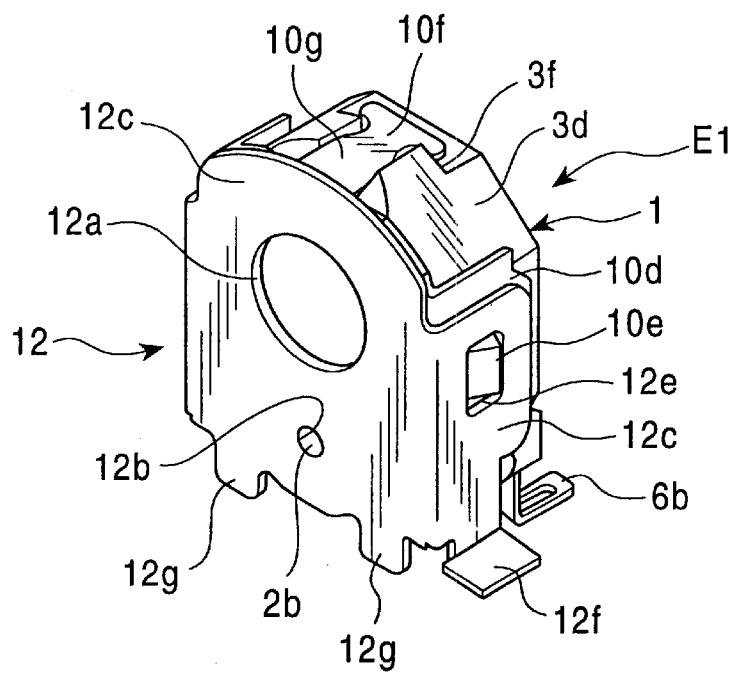
FIG. 48 is a perspective view showing a state in which the second example of the mounting plate is mounted to the body of the rotary encoder in accordance with the present invention.
Figure 49:
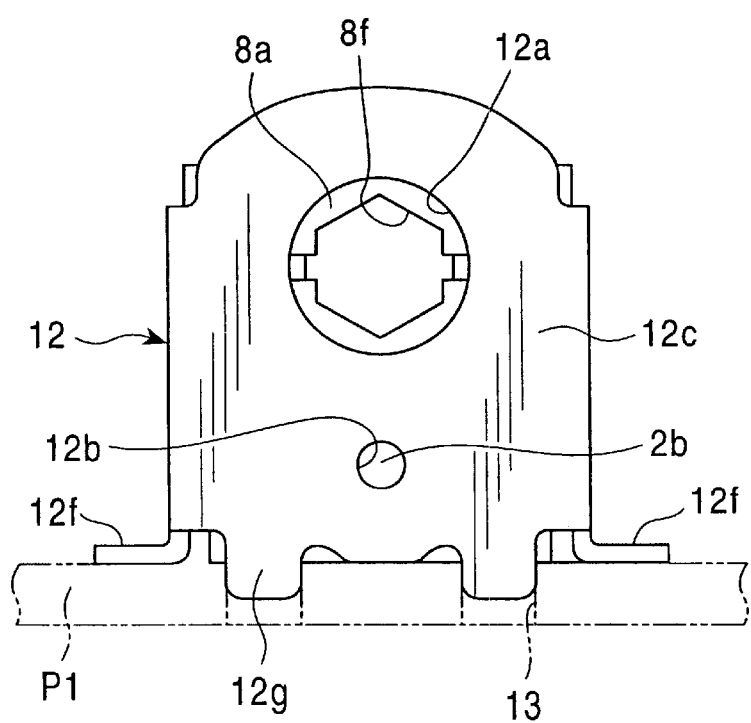
FIG. 49 is a back view showing the state in which the second example of the mounting plate is mounted to the body of the rotary encoder in accordance with the present invention.
Figure 50:
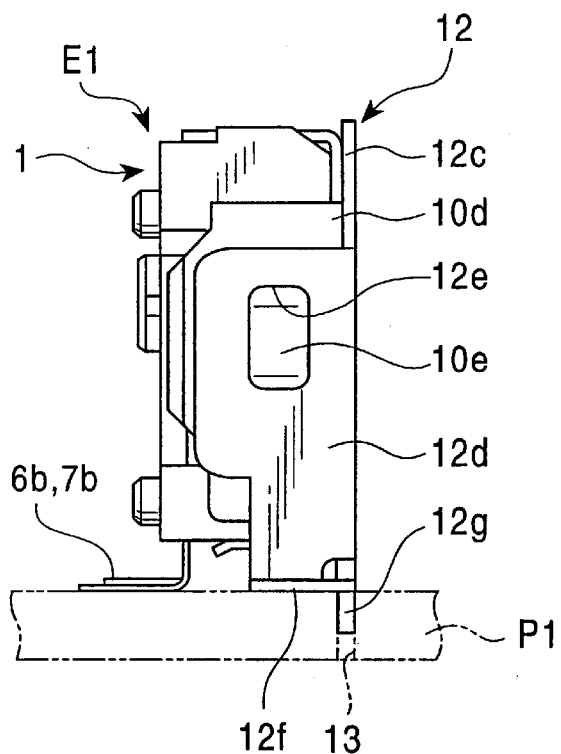
FIG. 50 is a side view showing the state in which the second example of the mounting plate is mounted to the body of the rotary encoder in accordance with the present invention.
Figure 51:
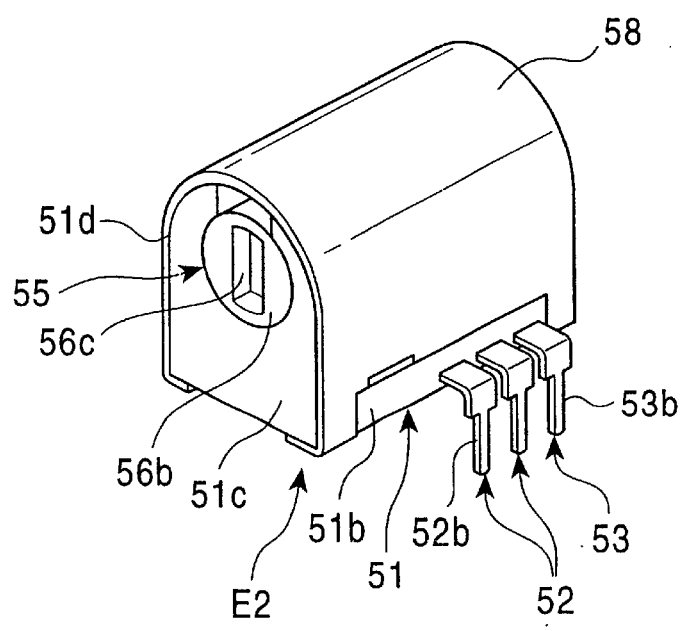
FIG. 51 is a perspective view of a conventional rotary encoder.
Figure 52:
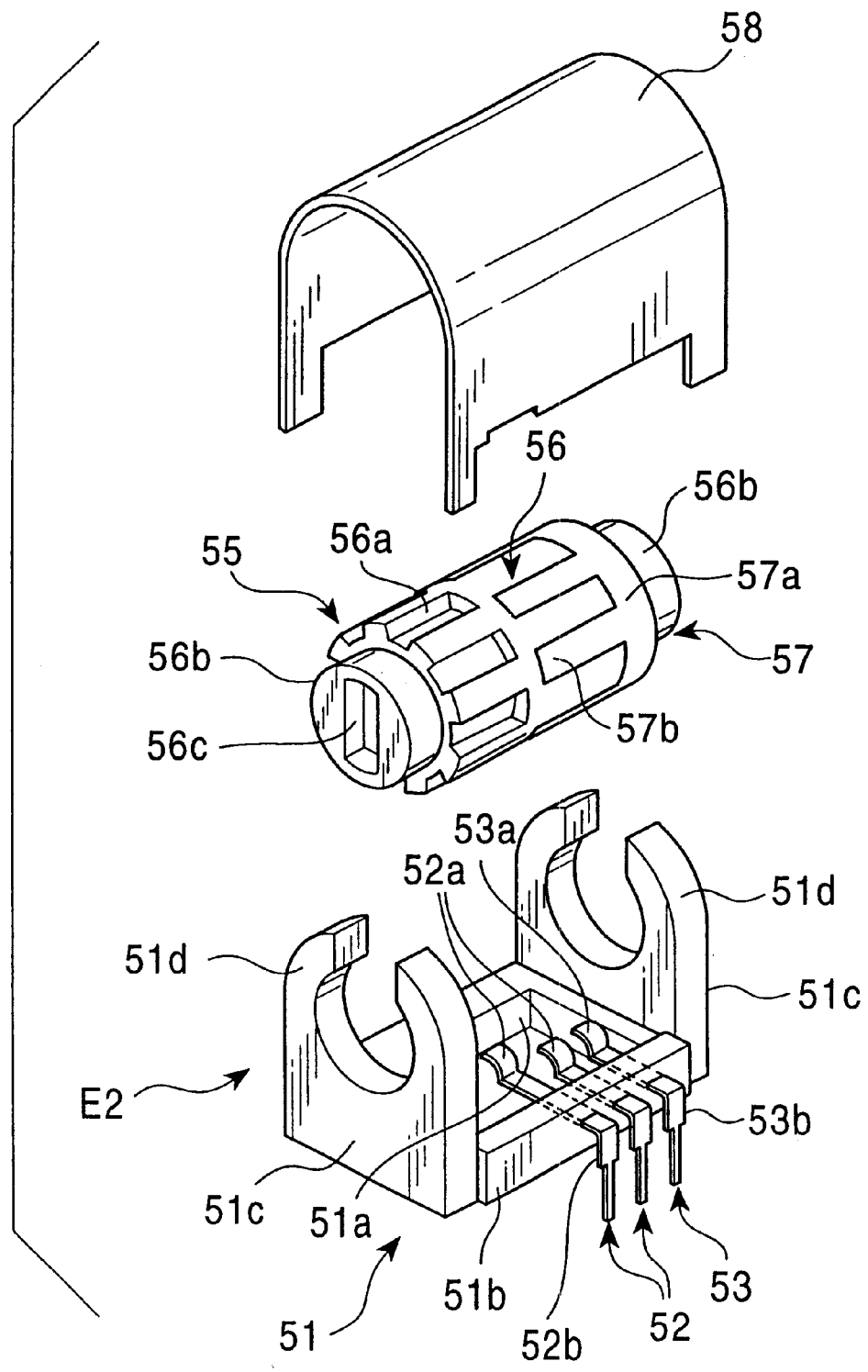
FIG. 52 is an exploded perspective view of the conventional rotary encoder.
Figure 53:
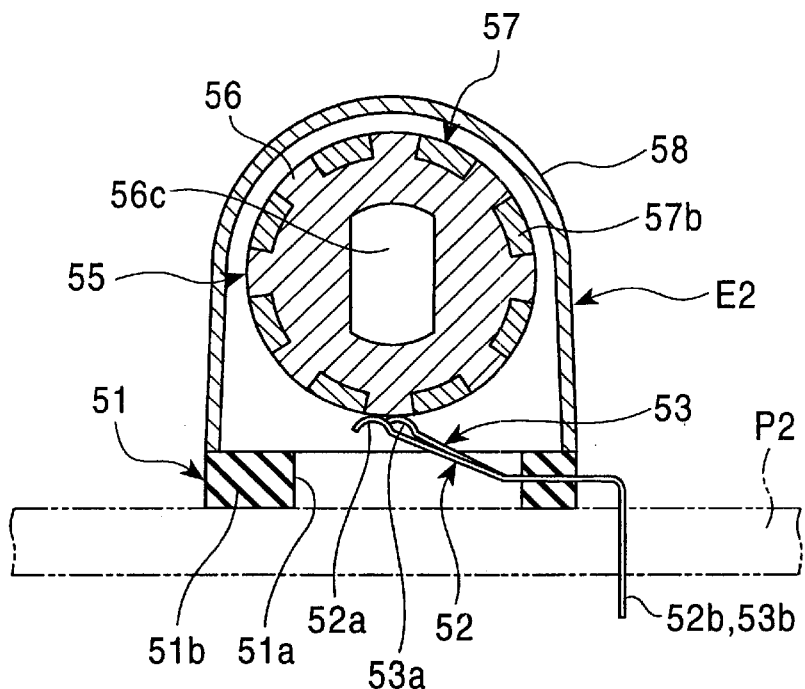
FIG. 53 is a sectional view showing a state in which a contactor resiliently presses a rotary member of the conventional rotary encoder.
Figure 54:
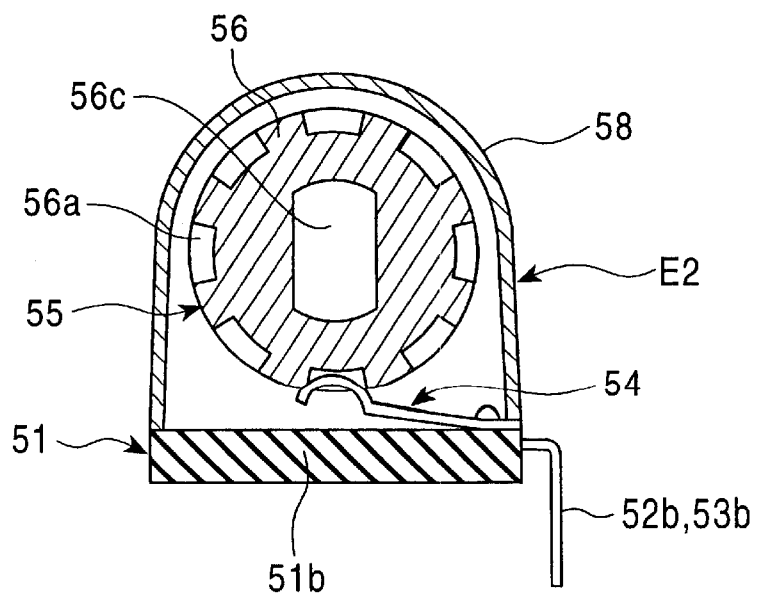
FIG. 54 is a sectional view showing a state in which a resilient plate resiliently presses the rotary member of the conventional rotary encoder.
Figure 55:
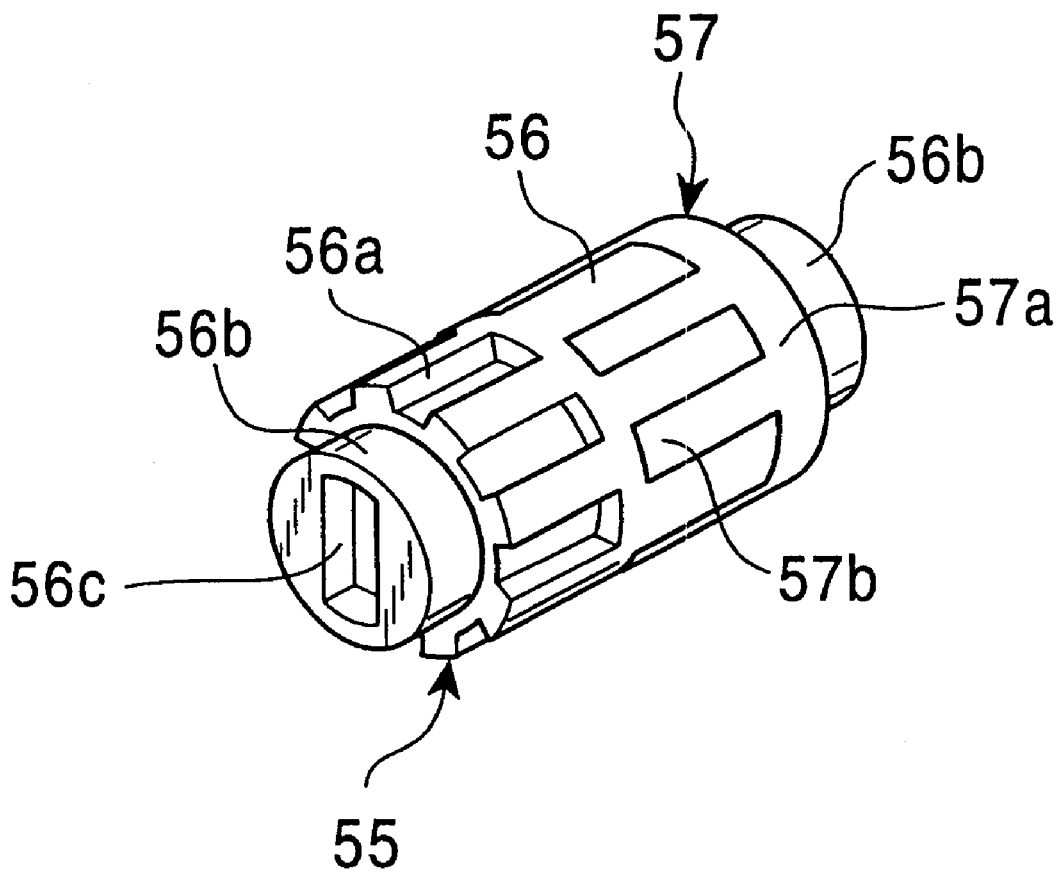
FIG. 55 is a perspective view of the rotary member of the conventional rotary encoder.

As shown in FIGS. 48–50, the mounting plate 12 is positioned at the engaging portion 10 side of a body E1 of the encoder (as in the first embodiment) in order to insert the protrusion 2b of the second embodiment of the insulating base 1 into the small hole 12b.

Thereafter, the arms 12d are placed on and pushed onto the side plates 10d of the engaging member 10. The cut-and-raised portions 10e are positioned at the holes 12e in order to catch the arms 12d by the cut-and-raised portions 10e. This causes the mounting plate 12 to be snappingly stopped by the engaging member 10, whereby the mounting plate 12 is mounted to the engaging member 10.

As shown in FIGS. 48–50, when the mounting plate 12 is mounted, the flat portion 12c is placed upon an outer side of the plate-shaped base portion 10a of the engaging member 10. In addition, the arms 12d are mounted to the side plates 10d of the engaging member 10, at the left and right horizontal portions of the rotary member 8. Further, the bottom surfaces of the mounting portions 12f (formed by bending from the side end portions of the arms 12d) extending in the rotational axis of the rotary member 8 are disposed at almost the same locations as the L-shaped terminal 7b of the common contactor 7 and the L-shaped terminal portions 6b of the contactors 6, which extend from the bottom surface of the insulating base 1.

As shown in FIGS. 49 and 50, regarding the body E1 of the encoder in which the mounting plate 12 is mounted, the bottom side of the main base portion 2 and the bottom sides of the auxiliary base portions 5 are made to oppose a printed board P1 in order to insert the protrusions 12g into the holes of printed board P1. This causes the body E1 of the encoder to be positioned at the printed board P1, and the terminals 6b of the contactors 6, the terminal portion 7b of the common contactor 7, and the mounting portions 12f of the mounting plate 12 to be disposed on a wiring pattern (not shown) formed on the top surface of the printed board P1.

The contactors 6, the common contactor 7, and the mounting plate 12 having the above-described structures are mounted to the surface of the wiring pattern of the printed board P1 by cream soldering. This causes the body E1 of the encoder, which extends in a direction parallel to the rotational axis of the rotary member 8, to be mounted to the printed board P1. The body E1 of the encoder is therefore mounted in a standing manner.

The operation of the rotary encoder having the above-described structures will be described. An operating member (not shown) engages the hole 8f of the rotary member 8 by passing it through the hole 12a of the mounting plate 12. Alternatively, the engaging member 10 (or the operating member) engages the hole 8f of the rotary member 8 from the opposite side. When the operating member is rotated, the rotary member 8 and the code member 9 are rotated with the shaft 8a as a support.

The uneven portion 8d of the rotary member 8 is made to intermittently engage the engaging portion 10b to perform a clicking operation. In addition, the tongues 9b are configured to intermittently contact with (and separate from) the contactors 6, and the common contactor 7 is configured to continuously contact the plate-shaped portion 9a, so that a two-phase pulse signal is generated between the contactors 6 and the common contactor 7 as the rotary member is rotated.

Although in the above-described examples, a common pattern is used, the common contactor is not needed if one contactor has a plurality of contact portions, and at least one of the contact portions is made to contact the code pattern at all times.

What is claimed is:

1. A rotary encoder comprising:
   a rotary member formed of an insulating material and having at least one of a columnar shape, a cylindrical shape, and a truncated conical shape;
   a code member mounted to the rotary member and formed of a metallic plate; and
   a plurality of contactors which contact the code member;
   wherein the code member comprises an annular plate-shaped portion and a plurality of tongues, said plurality of tongues being formed by bending a portion of the metallic plate from the plate-shaped portion;
   wherein the plate-shaped portion is disposed in a direction perpendicular to a rotational axis of the rotary member; and
   wherein the tongues are disposed so as to be exposed at a circumferential surface side of the rotary member.

2. A rotary encoder according to claim 1, wherein the tongues of the code member are formed as a result of bending the metallic plate from an outer peripheral portion of the plate-shaped portion.

3. A rotary encoder according to claim 1, wherein the tongues of the code member are formed as a result of bending the metallic plate from an inner peripheral portion of the plate-shaped portion.

4. A rotary encoder according to claim 2, wherein the tongues of the code member are disposed at an outer circumferential surface side of the rotary member.

5. A rotary encoder according to claim 3, wherein the tongues of the code member are disposed at an outer circumferential surface side of the rotary member.

6. A rotary encoder according to claim 2, wherein the rotary member has a cylindrical shape, and wherein the tongues of the code member are disposed at an inner circumferential surface side of the rotary member.

7. A rotary encoder according to claim 3, wherein the rotary member has a cylindrical shape, and wherein the tongues of the code member are disposed at an inner circumferential surface side of the rotary member.

8. A rotary encoder according to claim 1, wherein the code member is embedded in the rotary member.

9. A rotary encoder according to claim 1, wherein the tongues of the code member are fitted into grooves formed in the circumferential surface side of the rotary member.

10. A rotary encoder according to claim 8, wherein the plate-shaped portion is disposed at an end surface side of the rotary member, said plate-shaped portion extending perpendicular to the rotational axis of the rotary member.

11. A rotary encoder according to claim 1, wherein the contactors are brought into contact with the plate-shaped portion and the tongues, wherein the plate-shaped portion is a common contact, and wherein the tongues are change-over contacts.

12. A rotary encoder comprising:
   a rotary member formed of an insulating material and having at least one of a columnar shape, a cylindrical shape, and a truncated conical shape;
   a code pattern provided at an external surface of the rotary member; and
   a plurality of contactors which contact the code pattern;
   wherein the code pattern is formed at a circumferential surface of the rotary member;
   wherein a common pattern is formed at an end surface of the rotary member, said common pattern being electrically conductive with the code pattern; and
   wherein a common contactor is in contact with the common pattern.

13. A rotary encoder according to claim 12, wherein the code pattern is formed at an outer circumferential surface of the rotary member.

14. A rotary encoder according to claim 12, wherein the rotary member has a cylindrical shape, and wherein the code pattern is formed at an inner circumferential surface of the rotary member.

15. A rotary encoder according to claim 12, wherein a plurality of the contactors are disposed opposite each other, with the circumferential surface of the rotary member being disposed therebetween, and wherein the common contactor is disposed so as to oppose the end surface of the rotary member.

16. A rotary encoder according to claim 15, wherein the contactors and the common contactor are mounted to an insulating base formed of an insulating material, said contactors and said common contactor being mounted so as to be spaced in a direction of an axis of rotation of the rotary member, with the insulating base serving as a reference surface.

17. A rotary encoder comprising:
   a rotary member formed of an insulating material and having at least one of a columnar shape, a cylindrical shape, and a truncated conical shape;
   a code pattern formed at an external surface of the rotary member; and
   a plurality of contactors which contact the code pattern;
   wherein the code pattern is formed at a circumferential surface of the rotary member;
   wherein a clicking uneven portion is formed at one end surface of the rotary member; and
   wherein an engaging member is configured to intermittently engage the uneven portion in order to form a click mechanism.

18. A rotary encoder according to claim 17, wherein a common pattern which is electrically conductive with the code pattern is formed at the other end surface of the rotary member which opposes the one end surface of the rotary member, and wherein a common contactor is in contact with the common pattern.

19. A rotary encoder according to claim 18, wherein the plurality of contactors are disposed opposite each other, with the circumferential surface of the rotary member being disposed therebetween, wherein the engaging member is disposed so as to oppose the one end surface of the rotary member, and wherein the common contactor is disposed so as to oppose the other end surface of the rotary member.

20. A rotary encoder according to claim 19, wherein the contactors and the common contactor are mounted to an insulating base formed of an insulating material, and wherein the contactors, the common contactor, and the engaging member are provided so as to be spaced along a direction of an axis of rotation of the rotary member, with the insulating base serving as a reference surface.

* * * * *